(12) United States Patent
Kabasawa et al.

(10) Patent No.: US 11,003,054 B2
(45) Date of Patent: May 11, 2021

(54) CAMERA CONTROL DEVICE AND IMAGING DEVICE WITH CAMERA SHAKE CORRECTION FUNCTION

(71) Applicant: SONY CORPORATION, Tokyo (JP)

(72) Inventors: Hidetoshi Kabasawa, Kanagawa (JP); Kosei Yamashita, Kanagawa (JP); Sho Murakoshi, Tokyo (JP); Tomohiro Matsumoto, Kanagawa (JP); Masahiro Segami, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 10 days.

(21) Appl. No.: 16/349,763

(22) PCT Filed: Dec. 13, 2017

(86) PCT No.: PCT/JP2017/044704
§ 371 (c)(1),
(2) Date: May 14, 2019

(87) PCT Pub. No.: WO2018/116930
PCT Pub. Date: Jun. 28, 2018

(65) Prior Publication Data
US 2019/0331983 A1  Oct. 31, 2019

(30) Foreign Application Priority Data
Dec. 21, 2016 (JP) .............................. JP2016-248063

(51) Int. Cl.
*G03B 17/02* (2021.01)
*G01P 15/12* (2006.01)
(Continued)

(52) U.S. Cl.
CPC .............. *G03B 17/02* (2013.01); *G01P 15/12* (2013.01); *G01P 15/125* (2013.01); *G01P 15/18* (2013.01);
(Continued)

(58) Field of Classification Search
CPC . G03B 17/02; G03B 5/02; G03B 5/04; G03B 7/091; G03B 2217/005;
(Continued)

(56) References Cited

U.S. PATENT DOCUMENTS 5,456,111 A * 10/1995 Hulsing, II ........... G01P 15/097
73/514.32
2008/0289417 A1 11/2008 Okada
(Continued)

FOREIGN PATENT DOCUMENTS

| CN | 101765404 A | 6/2010 |
| CN | 105430245 A | 3/2016 |

(Continued)

OTHER PUBLICATIONS

International Search Report and Written Opinion of PCT Application No. PCT/JP2017/044704, dated Mar. 13, 2018, 08 pages of ISRWO.

(Continued)

*Primary Examiner* — Lin Ye
*Assistant Examiner* — Chan T Nguyen
(74) *Attorney, Agent, or Firm* — Chip Law Group

(57) ABSTRACT

A control unit generates a first control signal for camera shake correction on the basis of a first acceleration detection signal, a second acceleration detection signal, and an angular velocity signal. The first acceleration detection signal including information relating to an acceleration acting on a camera and has an alternating current (AC) waveform corresponding to the acceleration. The second acceleration detection signal including information relating to the acceleration and has an output waveform. An AC component corresponding to the acceleration is superimposed on a direct current (DC) component in the output waveform. The (Continued)

angular velocity signal including information relating to an angular velocity acting on the camera.

12 Claims, 17 Drawing Sheets

(51) Int. Cl.
| | | |
|---|---|---|
| *G01P 15/125* | (2006.01) | |
| *G01P 15/18* | (2013.01) | |
| *G03B 5/02* | (2021.01) | |
| *G03B 5/04* | (2021.01) | |
| *G03B 7/091* | (2021.01) | |
| *H04N 5/232* | (2006.01) | |

(52) U.S. Cl.
CPC ............... *G03B 5/02* (2013.01); *G03B 5/04* (2013.01); *G03B 7/091* (2013.01); *H04N 5/232* (2013.01)

(58) Field of Classification Search
CPC . G03B 2205/0007; G03B 17/00; G01P 15/12; G01P 15/125; G01P 15/18; G01P 15/09; H04N 5/232; H04N 5/23258; H04N 5/2328
USPC ........................................................ 348/345
See application file for complete search history.

(56) References Cited

U.S. PATENT DOCUMENTS

| | | | | |
|---|---|---|---|---|
| 2012/0112765 | A1* | 5/2012 | Sparks | ................. G01N 29/036 |
| | | | | 324/633 |
| 2016/0245667 | A1* | 8/2016 | Najafi | ................. G01C 25/005 |
| 2019/0331983 | A1 | 10/2019 | Kabasawa et al. | |

FOREIGN PATENT DOCUMENTS

| | | | |
|---|---|---|---|
| CN | 105749548 A | | 7/2016 |
| EP | 1953499 A2 | | 8/2008 |
| JP | 2007-232662 A | | 9/2007 |
| JP | 2008-046073 A | | 2/2008 |
| JP | 2008046073 | * | 2/2008 |
| JP | 2008-190931 A | | 8/2008 |
| JP | 2010-025965 A | | 2/2010 |
| JP | 2010025965 | * | 2/2010 |
| JP | 2013-182196 A | | 9/2013 |
| JP | 2016-059191 A | | 4/2016 |
| WO | 2016/088530 A1 | | 6/2016 |

OTHER PUBLICATIONS

Office Action for CN Patent Application No. 201780076635.1 dated Dec. 3, 2020, 9 pages of Office Action.

* cited by examiner

CAMERA CONTROL DEVICE AND IMAGING DEVICE WITH CAMERA SHAKE CORRECTION FUNCTION

CROSS REFERENCE TO RELATED APPLICATIONS

This application is a U.S. National Phase of International Patent Application No. PCT/JP2017/044704 filed on Dec. 13, 2017, which claims priority benefit of Japanese Patent Application No. JP 2016-248063 filed in the Japan Patent Office on Dec. 21, 2016. Each of the above-referenced applications is hereby incorporated herein by reference in its entirety.

TECHNICAL FIELD

The present technology relates to a camera control device and an imaging device having a camera shake correction function.

BACKGROUND ART

In general, an angular velocity sensor for detecting angular velocities around two axes perpendicular to an optical axis of a camera or three axes including an optical axis direction has been used for a camera shake correction technology of a camera. Meanwhile, the angular velocity sensor may not detect a shake in a translational direction of the camera. Therefore, for example, in an image shooting mode of taking a close-up picture of a subject as in micro photography, an influence of a shake (translational shake) in the translational direction is larger than an influence of an angular shake, and thus it is impossible to accurately perform camera shake correction.

Therefore, in recent years, a camera including not only the angular velocity sensor but also an acceleration sensor for detecting accelerations in two axis directions perpendicular to the optical axis or in three axis directions including the optical axis direction has been known (for example, see Patent Literature 1). In this way, it is considered that accuracy of camera shake correction can be improved during micro photography. For example, a capacitive acceleration sensor has been widely used as the acceleration sensor (for example, see Patent Literature 2).

CITATION LIST

Patent Literature

Patent Literature 1: JP-A-2010-25965
Patent Literature 2: JP-A-2016-59191

DISCLOSURE OF INVENTION

Technical Problem

The capacitive acceleration sensor detects acceleration on the basis of a capacitance change between electrodes, and thus is susceptible to an influence of gravity, so that not only motion acceleration but also gravitational acceleration superimposes on an output. As a result, there is a large error in estimation of translational acceleration when an inclination of the camera occurs during translational camera shake correction, and it is difficult to effectively correct a translational shake in micro photography, etc.

In view of circumstances as described above, an object of the present technology is to provide a camera control device and an imaging device capable of improving accuracy of camera shake correction.

Solution to Problem

A camera control device according to an aspect of the present technology includes a control unit.

The control unit generates a first control signal for camera shake correction on a basis of a first acceleration detection signal, a second acceleration detection signal, and an angular velocity signal, the first acceleration detection signal including information relating to an acceleration acting on a camera, the first acceleration detection signal having an alternating current (AC) waveform corresponding to the acceleration, the second acceleration detection signal including information relating to the acceleration, the second acceleration detection signal having an output waveform, an AC component corresponding to the acceleration being superimposed on a direct current (DC) component in the output waveform, the angular velocity signal including information relating to an angular velocity acting on the camera.

In the camera control device, the control unit extracts a dynamic acceleration component and a static acceleration component from the acceleration on the basis of the first acceleration detection signal and the second acceleration detection signal. In this way, the camera shake correction accuracy can be improved by separating the acceleration component corresponding to the gravitational acceleration from the acceleration acting on the camera.

The control unit may include an acceleration calculation unit and a correction signal generation circuit.

The acceleration calculation unit extracts a dynamic acceleration component and a static acceleration component from the acceleration on the basis of the first acceleration detection signal and the second acceleration detection signal.

The correction signal generation circuit generates the first control signal on the basis of the angular velocity signal and the dynamic acceleration component.

The correction signal generation circuit may be configured to further generate a second control signal including information relating to posture of the camera with respect to a horizontal direction on the basis of the second acceleration detection signal.

According to the camera control device, since an acceleration component corresponding to the gravitational acceleration can be extracted from the acceleration acting on the camera, the posture of the camera with respect to the horizontal direction can be detected with high accuracy.

The first acceleration detection signal may include information relating to accelerations in directions of two axes orthogonal to an optical axis of the camera, the angular velocity signal may include information relating to angular velocities around the two axes, and the control unit may acquire information relating to an angular velocity around an axis parallel to the optical axis of the camera on the basis of the information relating to the accelerations in the directions of the two axes.

In this way, the angular velocity around the axis can be detected without requiring a sensor for detecting the angular velocity around the optical axis.

The acceleration calculation unit may include a calculation circuit that extracts the static acceleration component from the acceleration on the basis of a difference signal between the first acceleration detection signal and the second acceleration detection signal.

In addition, the acceleration calculation unit may further include a gain adjustment circuit that adjusts gain of each signal so that the first acceleration detection signal and the second acceleration detection signal are at the same level.

The acceleration calculation unit may further include a correction circuit that computes a correction coefficient on the basis of the difference signal and corrects one of the first acceleration detection signal and the second acceleration detection signal using the correction coefficient.

The camera control device may further include a detection unit.

The detection unit includes a movable portion, a piezoelectric first acceleration detection unit, and a non-piezoelectric second acceleration detection unit, the movable portion being movable upon receiving an acceleration, the piezoelectric first acceleration detection unit being provided on the movable portion to output the first acceleration detection signal, the non-piezoelectric second acceleration detection unit being provided on the movable portion to output the second acceleration detection signal.

The second acceleration detection unit may include a piezoresistive acceleration detection device.

Alternatively, the second acceleration detection unit may include a capacitive acceleration detection device.

An imaging device according to an aspect of the present technology includes: an imaging device; a lens; a detection unit; and a control unit.

The lens forms an image of a subject luminous flux on the imaging device,

The detection unit outputs a first acceleration detection signal, a second acceleration detection signal, and an angular velocity signal. The first acceleration detection signal includes information relating to acceleration acting on a camera and has an AC waveform corresponding to the acceleration. The second acceleration detection signal includes information relating to the acceleration and has an output waveform in which an AC component corresponding to the acceleration is superimposed on a DC component. The angular velocity signal includes information relating to an angular velocity acting on the camera.

The control unit generates a control signal for camera shake correction on the basis of the angular velocity signal, the first acceleration detection signal, and the second acceleration detection signal.

The imaging device may further include a driving unit that moves the lens or the imaging device on the basis of the control signal.

Alternatively, the imaging device may further include an electronic camera shake correction image processing circuit that generates a camera shake correction image on the basis of the control signal.

Advantageous Effects of Invention

As described above, according to the present technology, it is possible to image accuracy of camera shake correction.

Note that the effect described herein is not limited and may correspond to any of effects described in the present disclosure.

MODE(S) FOR CARRYING OUT THE INVENTION

Hereinafter, embodiments according to the present technology will be described with reference to drawings.

First Embodiment

Figure 1:
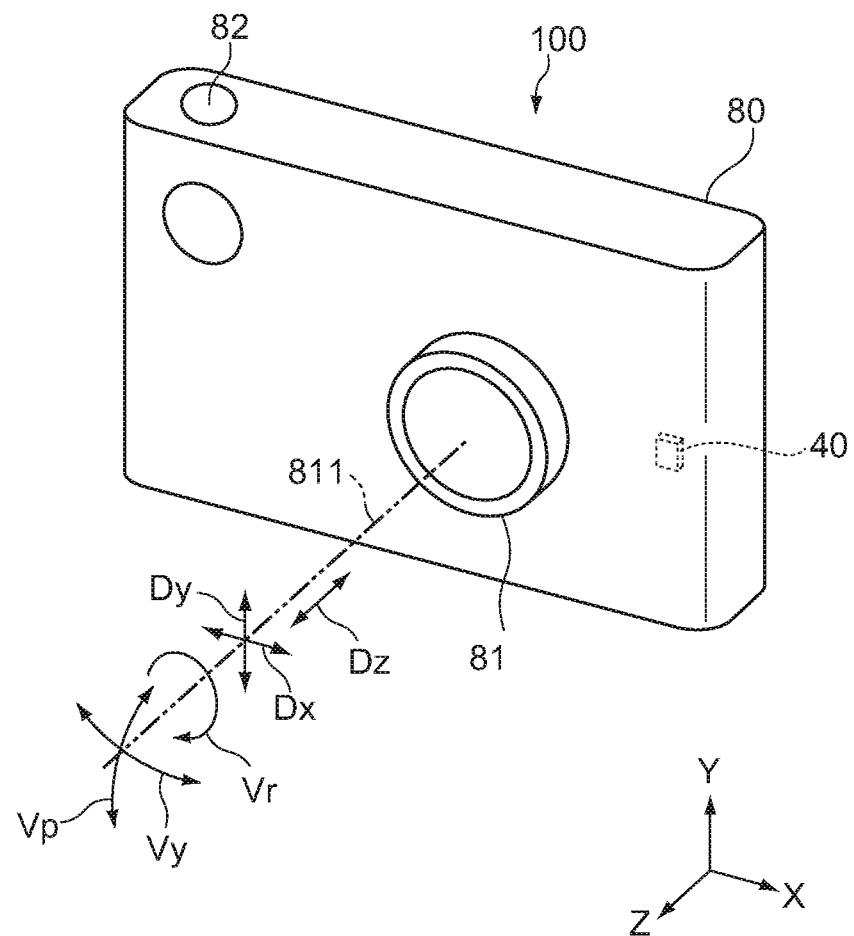
FIG. 1 is a schematic perspective view illustrating an imaging device according to an embodiment of the present technology.
Figure 2:
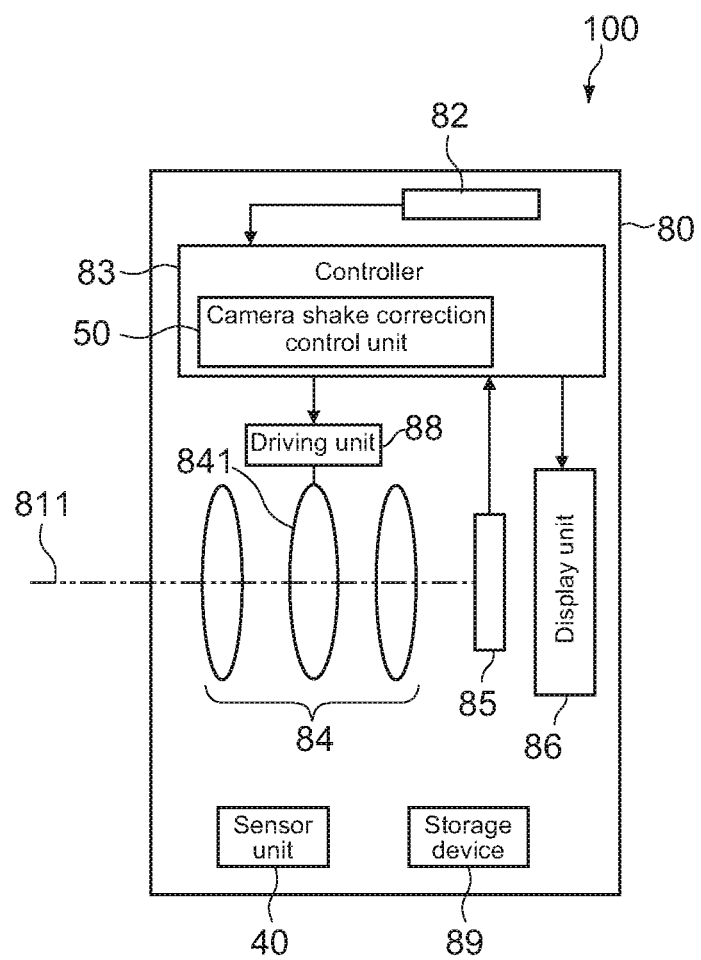
FIG. 2 is a block diagram illustrating a configuration of the imaging device.

FIG. 1 is a schematic perspective view illustrating an imaging device according to an embodiment of the present technology, and FIG. 2 is a block diagram illustrating a configuration thereof. In the present embodiment, a digital still camera (hereinafter simply referred to as a camera) will be described as an example of the imaging device. Note that in FIG. 1, an X-axis, a Y-axis, and a Z-axis mutually represent three orthogonal axis directions, and the Z-axis corresponds to an optical axis direction of the camera.

[Overall Configuration]

As illustrated in FIG. 1, a camera 100 includes a casing 80, a lens barrel 81 disposed on a front surface of the casing 80, a release button (shutter button) 82 disposed on an upper surface of the casing 80, etc. In addition, as illustrated in FIG. 2, the camera 100 includes a controller 83, a taking lens group 84, an imaging device 85, a display unit 86, a detection unit 40, a driving unit 88, a storage device 89, etc. Although not illustrated, the camera 100 further includes a power switch, a battery, etc.

In the camera 100, the controller 83 detecting an operation of pressing the release button 82 drives the taking lens group 84 to execute autofocus control and forms an image of a subject luminous flux incident along an optical axis 811 on the imaging device 85. The controller 83 includes an image processing unit for processing a subject image acquired by the imaging device 85, and displays the image processed by the image processing unit on the display unit 86 or stores the image in the storage device 89.

The controller 83 further includes a camera shake correction control unit 50. The camera shake correction control unit 50 drives a correction lens 841 via the driving unit 88 to detect a camera shake of the camera 100 on the basis of an output from the detection unit 40 and eliminate a blur of an image due to the camera shake.

Here, the camera shake is roughly divided into an angular shake and a translational shake.

The angular shake is a camera shake that causes parallel movement of an image accompanied with rotational tilt, and refers to an angular shake Vy around the X-axis (yaw direction) using the lens barrel 81 as a nodal point (rotation center) and an angular shake Vp around the Y-axis (pitch direction) as illustrated in FIG. 1.

In addition, the translational shake is a camera shake that causes parallel movement of an image not accompanied with rotational tilt, and refers to translational shakes Dx and Dy in X-axis the Y-axis directions perpendicular to the optical axis 811, a translational shake (out-of-focus) Dz in the optical axis 811 (Z-axis direction), and an angular shake Vr around the optical axis 811 (rolling direction).

In the present embodiment, the detection unit 40 includes an angular velocity sensor that detects angular velocity around the X-axis, Y-axis, and Z-axis acting on the camera 100, and an acceleration sensor that similarly detects accelerations in the X-axis, Y-axis, and Z-axis directions. The camera shake correction control unit 50 detects each of angular shakes Vy, Vp, and Vr or translational shakes Dx, Dy, and Dz on the basis of outputs of the angular velocity sensor and the acceleration sensor, generates a control signal (first control signal) for camera shake correction for moving the correction lens 841 in a direction to eliminate the blur of the image due to the camera shakes, outputs the generated control signal to the driving unit 88.

The detection unit 40 is used for detecting motion acceleration acting on the camera 100, the angle is mainly detected by the angular velocity sensor, and the translational acceleration is mainly detected by the acceleration sensor. Note that in this example, the detection unit 40 and the camera shake correction control unit 50 are included in a camera control device 150 (see FIG. 3) according to an embodiment of the present technology.

[Camera Control Device]

Figure 3:
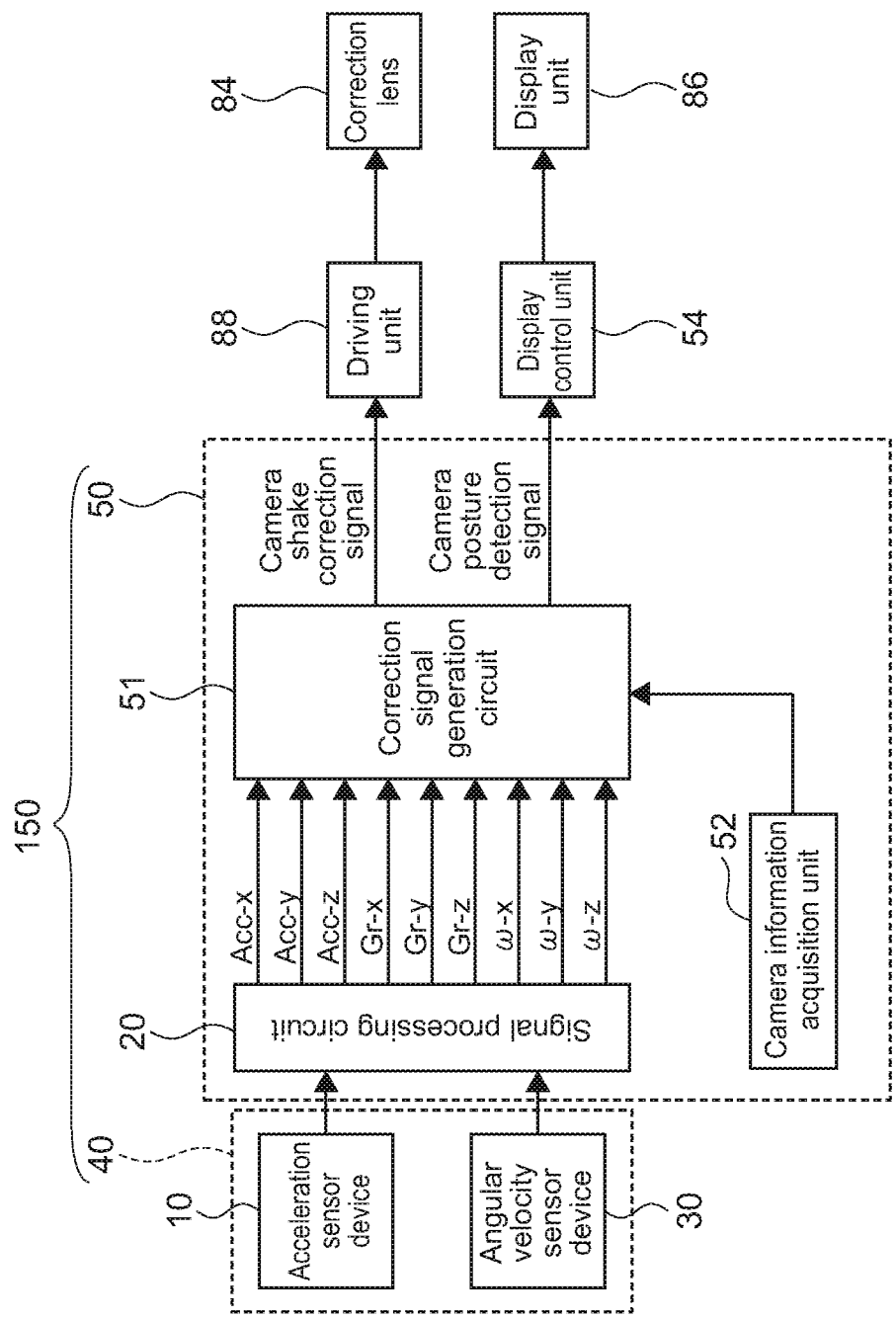
FIG. 3 is a block diagram schematically illustrating a configuration of a camera control device according to the embodiment of the present technology.

FIG. 3 is a block diagram schematically illustrating a configuration of the camera control device 150.

The camera control device 150 includes the detection unit 40 and the camera shake correction control unit 50.

The detection unit 40 includes an acceleration sensor device 10 and an angular velocity sensor device 30. The acceleration sensor device 10 detects accelerations in three orthogonal axis directions (x, y and z axes in FIG. 5). The angular velocity sensor device 30 detects an angular velocity around the three axes.

In the detection unit 40, the acceleration sensor and the angular velocity sensor for each axis may be individually configured, or may be configured as a single sensor capable of simultaneously detecting accelerations and angular velocities in three axis directions. In addition, the angular velocity may be detected using the acceleration sensor device 10 without providing the angular velocity sensor device 30.

As described later, the acceleration detection device 10 outputs a first acceleration detection signal and a second acceleration detection signal. The first acceleration detection signal includes information relating to acceleration acting on the camera 100, and has an AC waveform corresponding to the acceleration. The second acceleration detection signal includes information relating to the acceleration, and has an output waveform in which an AC component corresponding to the acceleration is superimposed on a DC component.

The camera shake correction control unit 50 includes a signal processing circuit 20, a correction signal generation circuit 51, and a camera information acquisition unit 52.

The signal processing circuit 20 is typically configured by a computer including a central processing unit (CPU)/micro processor unit (MPU) and a memory. The signal processing circuit 20 computes dynamic acceleration components (Acc-x, Acc-y, and Acc-z), static acceleration components (Gr-x, Gr-y, and Gr-z) and angular velocity signals (ω-x, ω-y, and ω-z) acquired at a predetermined sampling period on the basis of an output signal of the detection unit 40, and subsequently outputs the dynamic acceleration components, the static acceleration components, and the angular velocity signals to the correction signal generation circuit 51.

The signal processing circuit 20 performs separation into the dynamic acceleration components (Acc-x, Acc-y, and Acc-z) and the static acceleration components (Gr-x, Gr-y, and Gr-z) in three axis directions on the basis of the first and second acceleration detection signals output from the acceleration sensor device 10.

The signal processing circuit 20 computes each of the angular velocity signals (ω-x, ω-y, and ω-z) around the three axes on the basis of angular velocity detection signals around the three axes of the camera 100 detected from the angular velocity sensor device 30. The angular velocity sensor device 30 detects angular velocity around the x, y and z axes, respectively. Even though a vibration type gyro sensor is typically used for the angular velocity sensor device 30, a rotating top gyro sensor, a laser ring gyro sensor, a gas rate gyro sensor, etc. may be used besides the vibration type gyro sensor.

The correction signal generation circuit 51 is typically configured by a computer including a CPU/MPU and a memory. The correction signal generation circuit 51 determines a camera shake amount and posture of the camera 100 on the basis of a dynamic acceleration component and a static acceleration component of the camera 100 extracted in the signal processing circuit 20.

The correction signal generation circuit 51 generates a control signal (first control signal) for camera shake correction on the basis of the output of the signal processing circuit 20 and outputs the control signal to the driving unit 88. Further, the correction signal generation circuit 51 generates a camera posture detection signal (second control signal) including information relating to the posture of the camera 100 with respect to a horizontal direction on the basis of the output of the signal processing circuit 20, and outputs the generated camera posture detection signal to a display control unit 54. The display control unit 54 controls the display unit 86, and is configured as a part of the controller 83 in the present embodiment.

The camera information acquisition unit 52 acquires lens optical information (zoom, focus information, photographing magnification, etc.), and outputs the acquired lens optical information to the correction signal generation circuit 51. The camera information acquisition unit 52 includes, for example, a memory device for storing the lens optical information acquired by a focus encoder, a zoom encoder, etc.

(Acceleration Sensor Device)

Next, a description will be given of details of the acceleration sensor device 10 included in the detection unit 40.

Figure 4:
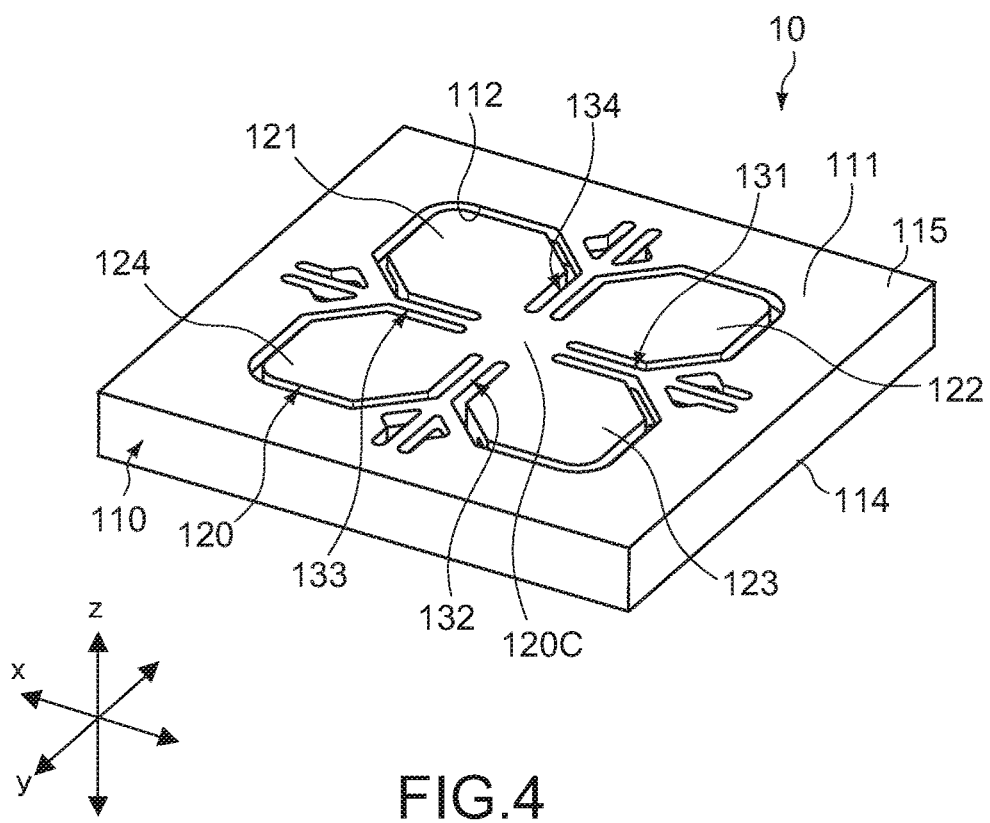
FIG. 4 is a perspective view of a front surface side schematically illustrating a configuration of an acceleration sensor device included in a detection unit in the imaging device.
Figure 5:
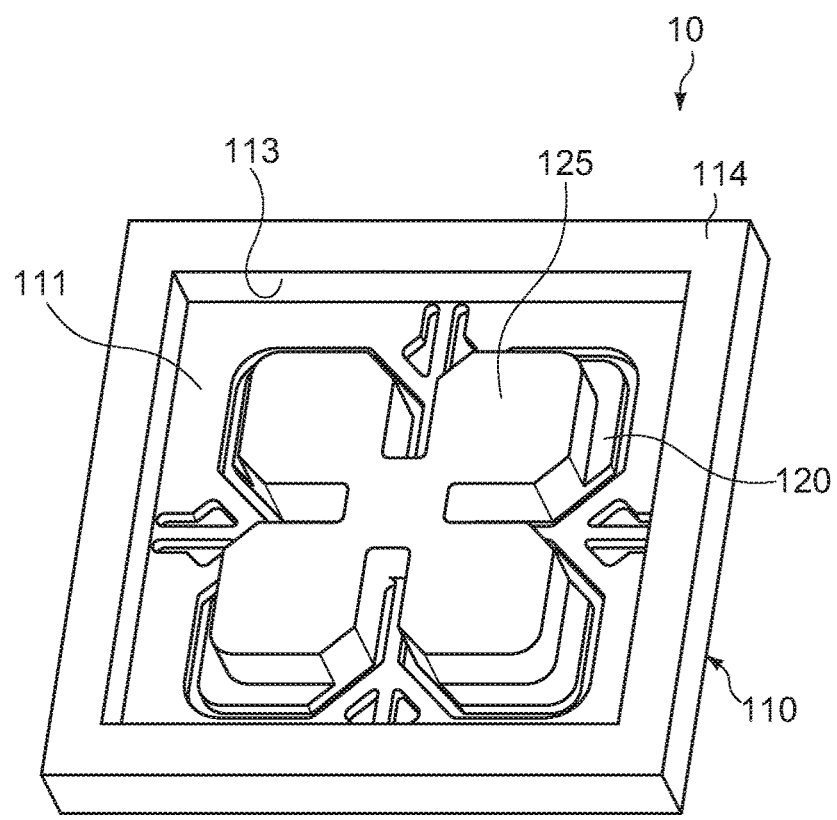
FIG. 5 is a perspective view of a back surface side of the acceleration sensor device.
Figure 6:
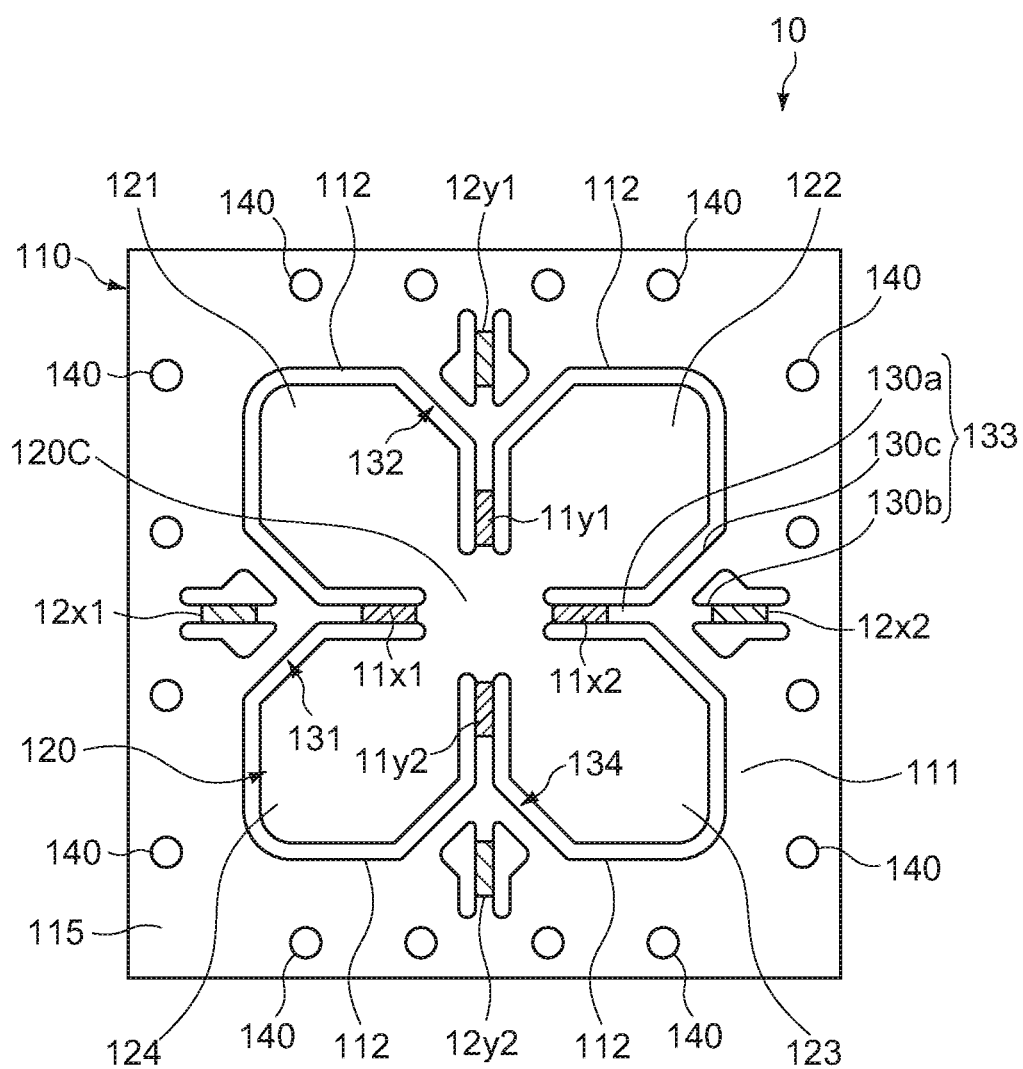
FIG. 6 is a plan view of the front surface side of the acceleration sensor device.

FIG. 4 to FIG. 6 are a perspective view of a front surface side schematically illustrating a configuration of the acceleration sensor device 10, a perspective view of a back surface side, and a plan view of the front surface side, respectively.

In the figures, an x-axis, a y-axis, and a z-axis indicate three axis directions orthogonal to one another, and a z-axis direction corresponds to a thickness direction (height direction) of the acceleration sensor device 10. Typically, the respective axes (x, y and z axes) of the acceleration sensor device 10 are mounted in the casing 80 to correspond to the directions of the three axes (X, Y and Z axes) of camera 100, respectively. However, the present technology is not limited thereto.

The acceleration sensor device 10 includes a device body 110, a first acceleration detection unit 11 (first detection devices 11$x$1, 11$x$2, 11$y$1, and 11$y$2), and a second acceleration detection unit 12 (second detection devices 12$x$1, 12$x$2, 12$y$1, and 12$y$2).

The device body 110 has a main surface portion 111 parallel to an xy plane and a support portion 114 on an opposite side. The device body 110 is typically formed of a silicon on insulator (SOI) substrate, and has a stacked structure of an active layer (silicon substrate) forming the main surface portion 111 and a frame-like support layer (silicon substrate) forming the support portion 114. The main surface portion 111 and the support portion 114 have different thicknesses, and the support portion 114 is formed to be thicker than the main surface portion 111.

The device body 110 has a movable plate 120 (movable portion) capable of moving by receiving acceleration. The movable plate 120 is provided at a central portion of the main surface portion 111, and is formed by processing the active layer forming the main surface portion 111 into a predetermined shape. More specifically, the movable plate 120 having a plurality of (in this example, four) blade portions 121 to 124 in a symmetrical shape with respect to the central portion of the main surface portion 111 is configured by the plurality of grooves 112 formed in the main surface portion 111. A peripheral portion of the main surface portion 111 is included in a base portion 115 facing the support portion 114 in the z-axis direction.

As illustrated in FIG. 5, the support portion 114 is formed in a frame shape having a rectangular recess 113 for opening a back surface of the movable plate 120. The support portion 114 is configured as a bonding surface bonded to a support substrate (not illustrated). The support substrate may be configured as a circuit board electrically connecting the sensor device 10 and the signal processing circuit 20 to each other, or may be configured as a relay substrate electrically connected to the circuit board or a package substrate. Alternatively, the support portion 114 may be provided with a plurality of external connection terminals electrically connected to the circuit board, the relay board, etc.

Each of the blade portions 121 to 124 of the movable plate 120 is formed of a plate piece of a predetermined shape (a roughly hexagonal shape in this example), and disposed at an interval of 90° around a central axis parallel to the z-axis. A thickness of each of the blade portions 121 to 124 corresponds to a thickness of the active layer included in the main surface portion 111. The respective blade portions 121 to 124 are integrally connected to each other at a central portion 120C of the movable plate 120, and are relatively movably supported relative to the base portion 115 as an integrated body.

As illustrated in FIG. 5, the movable plate 120 further has a weight portion 125. The weight portion 125 is integrally provided on a back surface of the central portion of the movable plate 120 and a back surface of each of the blade portions 121 to 124. A size, a thickness, etc. of the weight portion 125 are not particularly limited, and are set to appropriate sizes at which a desired vibration characteristic of the movable plate 120 can be obtained. The weight portion 125 is formed, for example, by processing the support layer forming the support portion 114 into a predetermined shape.

As illustrated in FIG. 4 and FIG. 6, the movable plate 120 is connected to the base portion 115 via a plurality of (four in this example) bridge portions 131 to 134. The plurality of bridge portions 131 to 134 are provided between the blade portions 121 to 124, respectively, and are formed by processing the active layer forming the main surface portion 111 into a predetermined shape. The bridge portion 131 and the bridge portion 133 are disposed to face each other in the x-axis direction, and the bridge portion 132 and the bridge portion 134 are disposed to face each other in the y-axis direction.

The bridge portions 131 to 134 form a part of a movable portion that can move relative to the base portion 115, and elastically support the central portion 120C of the movable plate 120. The bridge portions 131 to 134 have the same configuration, and each of the bridge portions 131 to 134 has a first beam portion 130$a$, a second beam portion 130$b$, and a third beam portion 130$c$ as illustrated in FIG. 6.

The first beam portion 130$a$ linearly extends from a peripheral portion of the central portion 120C of the movable plate 120 in each of the x-axis direction and the y-axis direction, and is disposed between the blade portions 121 to 124 adjacent to each other. The second beam portion 130$b$ linearly extends in each of the x-axis direction and the y-axis direction, and connects the first beam portion 130$a$ and the base portion 115 to each other.

The third beam portion 130$c$ linearly extends in each of directions intersecting the x-axis direction and the y-axis direction, respectively, and connects an intermediate portion of the first beam portion 130$a$ and the second beam portion 130b and the base portion 115 to each other. Each of the bridge portions 131 to 134 has two third beam portions 130c, and the two third beam portions 130c are configured to interpose one second beam portion 130b therebetween in the xy plane.

Rigidities of the bridge portions 131 to 134 are set to appropriate values that allow the movable plate 120 in motion to be stably supported. In particular, the bridge portions 131 to 134 are set to appropriate rigidities that allow deformation by a weight of the movable plate 120, and a magnitude of the deformation is not particularly limited as long as the magnitude can be detected by the second acceleration detection unit 12 described below.

As described above, the movable plate 120 is supported by the base portion 115 of the device body 110 via the four bridge portions 131 to 134, and is configured to be able to move (transfer) relative to the base portion 115 using the bridge portions 131 to 134 as fulcrums by an inertial force corresponding to acceleration.

Figure 7A:
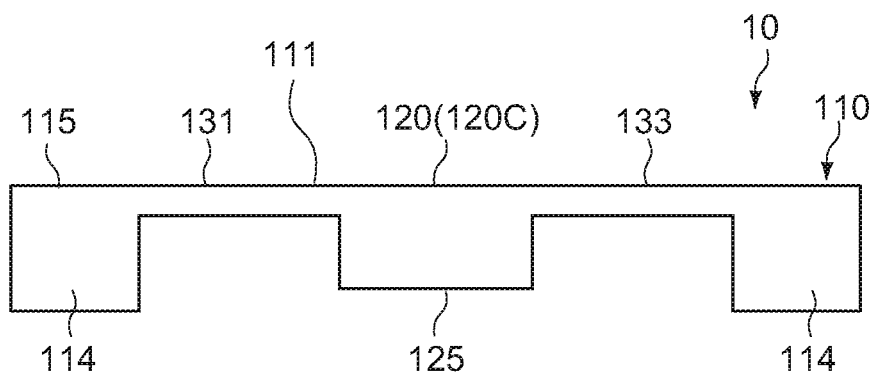
FIG. 7A is a schematic side sectional view for description of a state of motion of a main part of the acceleration sensor device and illustrates the state when acceleration is not applied.
Figure 7B:
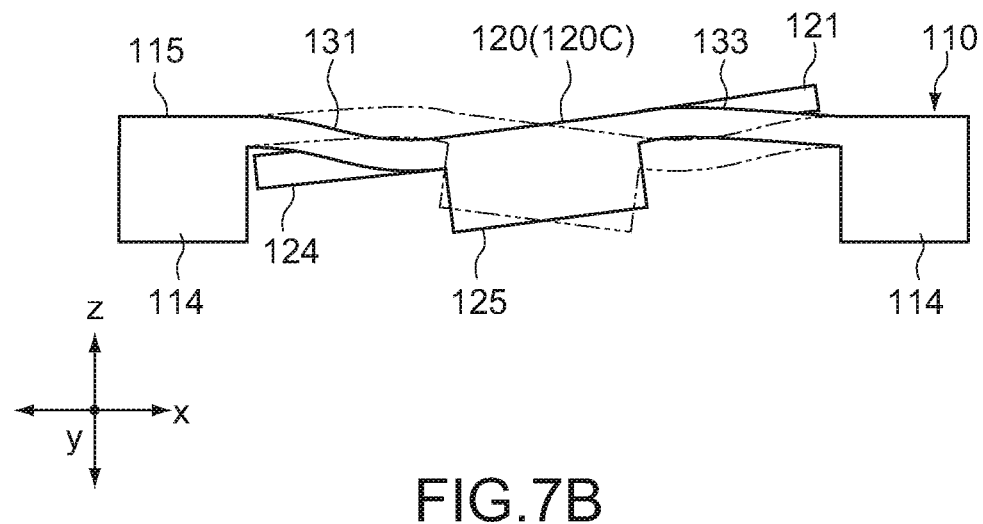
FIG. 7B is a schematic side sectional view for description of a state of motion of the main part of the acceleration sensor device and illustrates the state when acceleration is generated along an x-axis direction.
Figure 7C:
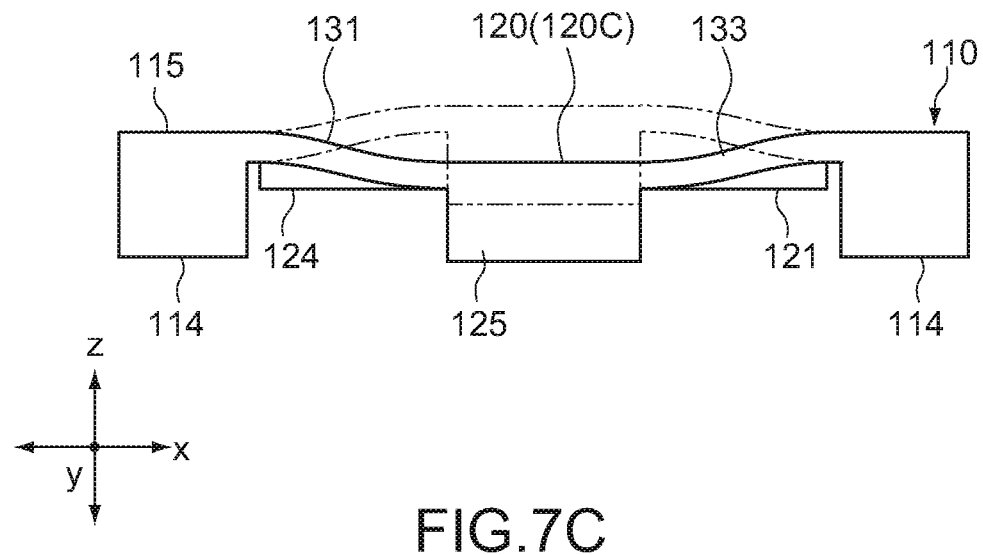
FIG. 7C is a schematic side sectional view for description of a state of motion of the main part of the acceleration sensor device and illustrates the state when acceleration is generated along a z-axis direction.

FIGS. 7A, 7B, and 7C are schematic side sectional views for description of states of motion of the movable plate 120. FIG. 7A illustrates the state when acceleration is not applied, FIG. 7B illustrates the state when acceleration is generated along the x-axis direction, and FIG. 7C illustrates the state when acceleration is generated along the z-axis direction, respectively. Note that a solid line in FIG. 7B indicates a state in which acceleration is generated in a left direction on a paper surface, and a solid line in FIG. 7C indicates a state in which acceleration is generated in an upward direction on a paper surface.

When acceleration is not generated, the movable plate 120 is maintained parallel to a surface of the base portion 115 as illustrated in FIG. 4 and FIG. 7A. In this state, for example, when acceleration along the x-axis direction is generated, the movable plate 120 is inclined counterclockwise around the bridge portions 132 and 134 extending in the y-axis direction as illustrated in FIG. 7B. In this way, the bridge portions 131 and 133 facing each other in the x-axis direction receive bending stresses in mutually opposite directions along the z-axis direction.

Similarly, when acceleration along the y-axis direction is generated, although not illustrated, the movable plate 120 is inclined counterclockwise (or clockwise) around the bridge portions 131 and 133 extending in the x-axis direction, and the bridge portions 132 and 134 facing each other in the y-axis direction receive bending stresses in mutually opposite directions along the z-axis direction.

Meanwhile, when acceleration along the z-axis direction is generated, the movable plate 120 moves up and down with respect to the base portion 115 as illustrated in FIG. 7C, and the respective bridge portions 131 to 134 receive bending stresses in the same direction along the z-axis direction.

The first acceleration detection unit 11 and the second acceleration detection unit 12 are provided in each of the bridge portions 131 to 134. The detection unit (inertial sensor) 40 measures a direction and a magnitude of acceleration acting on the sensor device 10 by detecting deformation due to bending stresses of the bridge portions 131 to 134 using the acceleration detection units 11 and 12.

Hereinafter, details of the acceleration detection units 11 and 12 will be described.

As illustrated in FIG. 6, the first acceleration detection unit 11 includes the plurality of (four in this example) first detection devices 11x1, 11x2, 11y1, and 11y2.

The detection devices 11x1 and 11x2 are provided on an axial center of surfaces of the two bridge portions 131 and 133 facing each other in the x-axis direction, one detection device 11x1 is disposed in the first beam portion 130a in the bridge portion 131, and the other detection device 11x2 is disposed in the first beam portion 130a in the bridge portion 133. Meanwhile, the detection devices 11y1 and 11y2 are provided on an axial center of surfaces of the two bridge portions 132 and 134 facing each other in the y-axis direction, one detection device 11y1 is disposed in the first beam portion 130a in the bridge portion 132, and the other detection device 11y2 is disposed in the first beam portion 130a in the bridge portion 134.

Each of the first detection devices 11x1 to 11y2 has the same configuration, and in the present embodiment, is configured as a rectangular piezoelectric detection device having a long side in an axial center direction of the first beam portion 130a. Each of the first detection devices 11x1 to 11y2 is formed as a stacked body of a lower electrode layer, a piezoelectric film, and an upper electrode layer.

The piezoelectric film is typically made of lead zirconate titanate (PZT). However, the present technology is not limited thereto. The piezoelectric film generates a potential difference between the upper electrode layer and the lower electrode layer in accordance with the amount of bending deformation (stress) in the z-axis direction of the first beam portion 130a (piezoelectric effect). Upper electrode layers re electrically connected to relay terminals 140 provided on the surface of the base portion 115 through wiring layers (not illustrated) formed on the bridge portions 131 to 134, respectively. The relay terminal 140 may be configured as an external connection terminal electrically connected to the support substrate. For example, the other end of a bonding wire whose one end is connected to the support substrate is connected thereto. The lower electrode layer is typically connected to a reference potential such as a ground potential.

The first acceleration detection unit 11 configured as described above performs outputting only when there is a change in stress due to a characteristic of the piezoelectric film, and does not perform outputting when a stress value does not change even if stress is applied. Thus, a magnitude of motion acceleration acting on the movable plate 120 is mainly detected. Therefore, an output (first detection signal) of the first acceleration detection unit 11 mainly includes an output signal having an AC waveform which is a dynamic component (AC component) corresponding to the motion acceleration.

Meanwhile, as illustrated in FIG. 6, the second acceleration detection unit 12 has a plurality of (four in this example) second detection devices 12x1, 12x2, 12y1, and 12y2.

The detection devices 12x1 and 12x2 are provided on the axial center of the surfaces of the two bridge portions 131 and 133 facing each other in the x-axis direction, one detection device 12x1 is disposed in the second beam portion 130b in the bridge portion 131, and the other detection device 12x2 is disposed in the second beam portion 130b in the bridge portion 133. Meanwhile, the detection devices 12y1 and 12y2 are provided on the axial center of the surfaces of the two bridge portions 132 and 134 facing each other in the y-axis direction, one detection device 12y1 is disposed in the second beam portion 130b in the bridge portion 132, and the other detection device 12y2 is disposed in the second beam portion 130b in the bridge portion 134.

Each of the second detection devices 12x1 to 12y2 has the same configuration, and in the present embodiment, is configured as a piezoresistive detection device having a long side in an axial center direction of the second beam portion 130b. Each of the second detection devices 12x1 to 12y2 has a resistive layer and a pair of terminal portions connected to both ends thereof in an axial direction.

The resistive layer is, for example, a conductor layer formed by doping a surface (silicon layer) of the second beam portion 130b with an impurity device, and generates a resistance change corresponding to the amount of bending deformation (stress) in the z-axis direction of the second beam portion 130b (piezoresistive effect). The pair of terminal portions is electrically connected to the relay terminals 140 provided on the surface of the base portion 115 through wiring layers (not illustrated) formed on the bridge portions 131 to 134, respectively.

The second acceleration detection unit 12 configured as described above detects not only the motion acceleration acting on the movable plate 120 but also gravitational acceleration acting on the movable plate 120 since a resistance value is determined by an absolute stress value due to a characteristic of a piezoresistance. Therefore, an output (second detection signal) of the second acceleration detection unit 11 has an output waveform in which a dynamic component (AC component) corresponding to motion acceleration is superimposed on gravitational acceleration or a static component (DC component) corresponding thereto.

Note that the second detection devices 12x1 to 12y2 are not limited to an example of being configured as piezoresistive type detection devices, and may be configured as, for example, other non-piezoelectric type detection devices such as electrostatic type detection devices capable of detecting acceleration of a DC component. In the case of the electrostatic type, a movable electrode portion and a fixed electrode portion constituting an electrode pair are disposed to be face each other in an axial direction of the second beam portion 130b, and configured such that a facing distance between the both electrode portions changes corresponding to the amount of bending deformation of the second beam portion 130b.

(Camera Shake Correction Control Unit)

Figure 8:
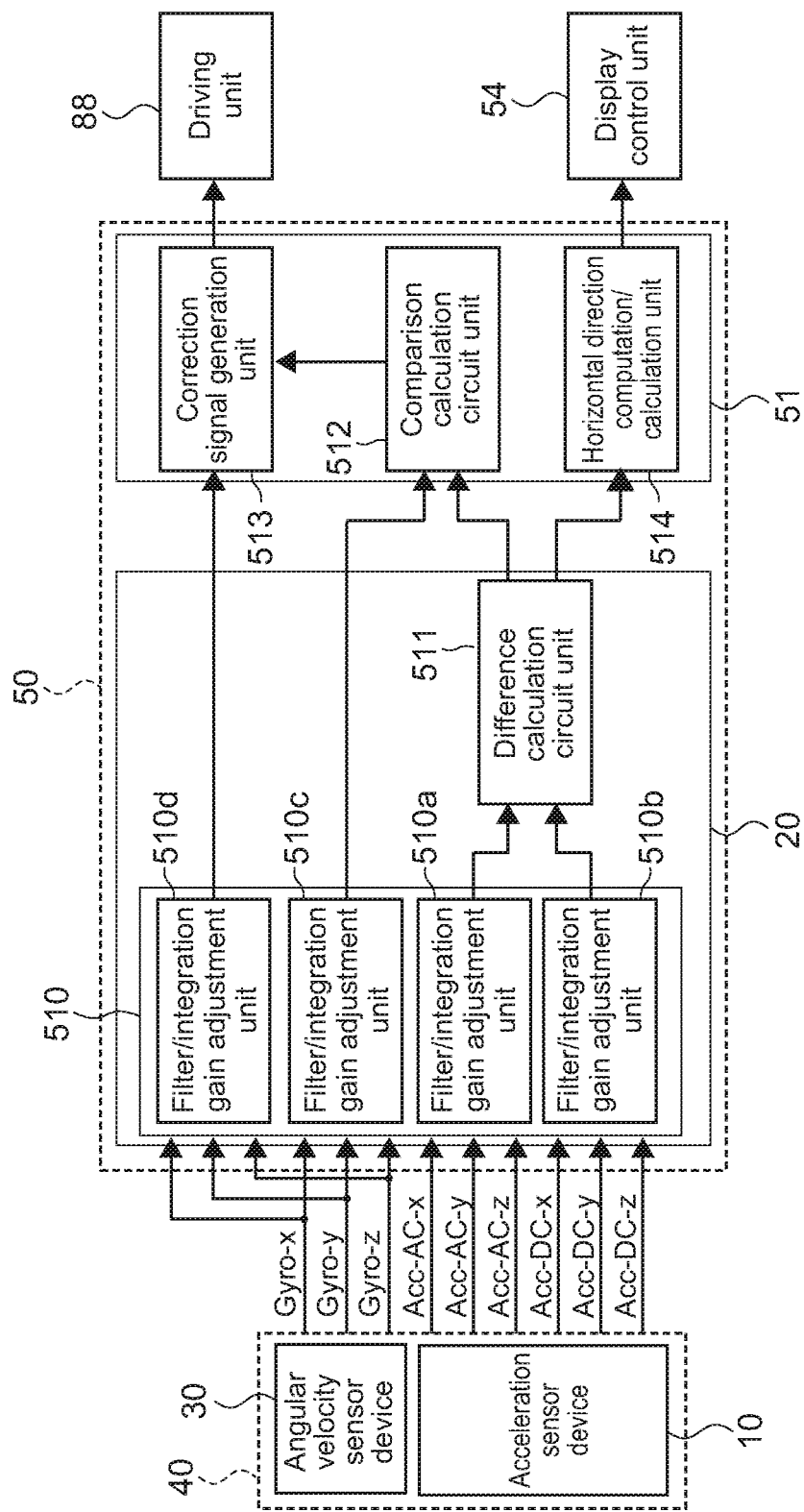
FIG. 8 is a block diagram illustrating a configuration of a camera shake correction control unit in the camera control device.

FIG. 8 is a block diagram illustrating a configuration of the camera shake correction control unit 50. As described above, the camera shake correction control unit 50 includes the signal processing circuit 20 and the correction signal generation circuit 51.

The first acceleration detection unit 11 outputs acceleration detection signals in each of the x-axis direction, the y-axis direction, and the z-axis direction (Acc-AC-x, Acc-AC-y, and Acc-AC-z (first acceleration detection signal)) to the signal processing circuit 20 on the basis of outputs of the first detection devices 11x1 to 11y2.

The acceleration detection signal (Acc-AC-x) in the x-axis direction corresponds to a difference signal (ax1-ax2) between the output (ax1) of the detection device 11x1 and the output (ax2) of the detection device 11x2. The acceleration detection signal (Acc-AC-y) in the y-axis direction corresponds to a difference signal (ay1-ay2) between the output (ay1) of the detection device 11y1 and the output (ay2) of the detection device 11y2. Further, the acceleration detection signal (Acc-AC-z) in the z-axis direction corresponds to a sum (ax1+ax2+ay1+ay2) of the outputs of the detection devices 11x1 to 11y2.

Similarly, the second acceleration detection unit 12 outputs acceleration detection signals in each of the x-axis direction, the y-axis direction, and the z-axis direction (Acc-DC-x, Acc-DC-y, and Acc-DC-z (second acceleration detection signal)) to the signal processing circuit 20 on the basis of outputs of the second detection devices 12x1 to 12y2.

The acceleration detection signal (Acc-DC-x) in the x-axis direction corresponds to a difference signal (bx1-bx2) between the output (bx1) of the detection device 12x1 and the output (bx2) of the detection device 12x2. The acceleration detection signal (Acc-DC-y) in the y-axis direction corresponds to a difference signal (by1-by2) between the output (by1) of the detection device 12y1 and the output (by2) of the detection device 12y2. Further, the acceleration detection signal (Acc-DC-z) in the z-axis direction corresponds to a sum (bx1+bx2+by1+by2) of the outputs of the detection devices 12x1 to 12y2.

A process of calculating the acceleration detection signal in each axis direction may be executed by a calculation circuit separately provided in the detection unit 40, or may be executed by the signal processing circuit 20.

The signal processing circuit 20 includes a preprocessing circuit 510 and a difference calculation circuit unit 511.

The preprocessing circuit 510 includes at least one of various filters (for example, high pass filters), an integration circuit, a gain adjustment circuit, etc. The preprocessing circuit 510 includes a preprocessing circuit unit 510a that processes the first acceleration detection signal, a preprocessing circuit unit 510b that preprocesses the second acceleration detection signal, and two preprocessing circuit units 510c and 510d that processes angular velocity signals (ω-x, ω-y, and ω-z). The preprocessing circuit units 510c and 510d are disposed in parallel, and the angular velocity signals (ω-x, ω-y, and ω-z) are input to each of the preprocessing circuit units.

The first acceleration detection signals (Acc-AC-x, Acc-AC-y, and Acc-AC-z) processed in the preprocessing circuit unit 510a are input to one input terminal of the difference calculation circuit unit 511, and the second acceleration detection signals (Acc-DC-x, Acc-DC-y, and Acc-DC-z) processed in the preprocessing circuit unit 510b are input to the other input terminal of the difference calculation circuit unit 511.

The difference calculation circuit unit 511 computes motion acceleration (camera shake) that acts when the camera 100 captures an image (when the release button 82 is pressed). In the difference calculation circuit unit 511, an acceleration calculation unit that extracts the dynamic acceleration components (Acc-x, Acc-y, and Acc-z) and the static acceleration components (Gr-x, Gr-y, and Gr-z) from the motion acceleration on the basis of the first acceleration detection signal and the second acceleration detection signal is configured. Note that details of the acceleration calculation unit (difference calculation circuit unit 511) will be described later.

The dynamic acceleration component typically refers to the AC component of the acceleration described above, and in the present embodiment, corresponds to motion acceleration (translational acceleration, centrifugal acceleration, tangential acceleration, etc.) due to camera shake of the camera 100 during image capturing. Meanwhile, the static acceleration component refers to the DC component of the acceleration, and typically corresponds to gravitational acceleration or acceleration estimated to be gravitational acceleration.

Further, the dynamic acceleration components (Acc-x, Acc-y, and Acc-z) extracted by the difference calculation circuit unit 511 are input to one input terminal of a comparison calculation circuit unit 512. Similarly, the static acceleration components (Gr-x, Gr-y, and Gr-z) extracted by the difference calculation circuit unit 511 are input to the horizontal direction computation/calculation unit 514.

Meanwhile, the angular velocity signals (ω-x, ω-y, and ω-z) processed in the preprocessing circuit unit 510c are input to the other input terminal of the comparison calculation circuit unit 512. The comparison calculation circuit unit 512 compares the input dynamic acceleration component and angular velocity component with each other to compute an angular shake amount, a translational shake amount, and a rotation center of the camera shake, and inputs an output signal including information thereof to one input terminal of a correction signal generation unit 513.

Here, the angular shake amount is computed on the basis of the angular velocity signals (ω-x, ω-y, and ω-z) of the respective axes, and the translational shake amount is computed on the basis of the dynamic acceleration components (Acc-x, Acc-y, and Acc-z) of the respective axes. In addition, with regard to the rotation center, the angular velocity signal and the dynamic acceleration component of the acceleration detection signal can be combined to compute a rotation radius and the rotation center of the camera shake (see Japanese Patent No. 5,407,863).

Further, the angular velocity signals (ω-x, ω-y, and ω-z) processed by the preprocessing circuit unit 510d are input to the other input terminal of the correction signal generation unit 513. The correction signal generation unit 513 generates a camera shake correction signal (first control signal) for eliminating a blur of an image due to a camera shake on the basis of the output of the comparison calculation circuit unit 512 and the output of the preprocessing circuit unit 510d.

The camera shake correction signal is a drive signal that gives an instruction to the driving unit 88 that drives the correction lens 841 with respect to the movement direction and the movement amount of the correction lens 841. In this instance, lens optical information (zoom, focus information, photographing magnification, etc.) of the taking lens group 84 read from the camera information acquisition unit 52 is referred to.

Note that instead of a scheme of correcting the camera shake by moving the correction lens 841, it is possible to apply a scheme of moving the imaging device 85. In this case, the camera shake correction signal corresponds to a drive signal to the driving unit for moving the imaging device 85.

The horizontal direction computation/calculation unit 514 generates a camera posture detection signal (second control signal) including information relating to the posture of the camera 100 with respect to the horizontal direction on the basis of the static acceleration component of the acceleration signal input from the difference calculation circuit unit 511, and outputs the generated signal to the display control unit 54.

In the horizontal direction computation/calculation unit 514, an inclination with respect to the horizontal direction of the camera 100 (the casing 80) is computed from the gravity direction (vertical direction) detected on the basis of the static acceleration components (Gr-x, Gr-y, and Gr-z) of the acceleration. The display control unit 54 corrects a horizontal shift of the image displayed on the display unit 86 on the basis of the camera posture detection signal. In this way, it possible to capture a natural image which is kept horizontal at all times regardless of a skill level of a user.

(Signal Processing Circuit)

Next, details of the signal processing circuit 20 will be described.

Figure 9:
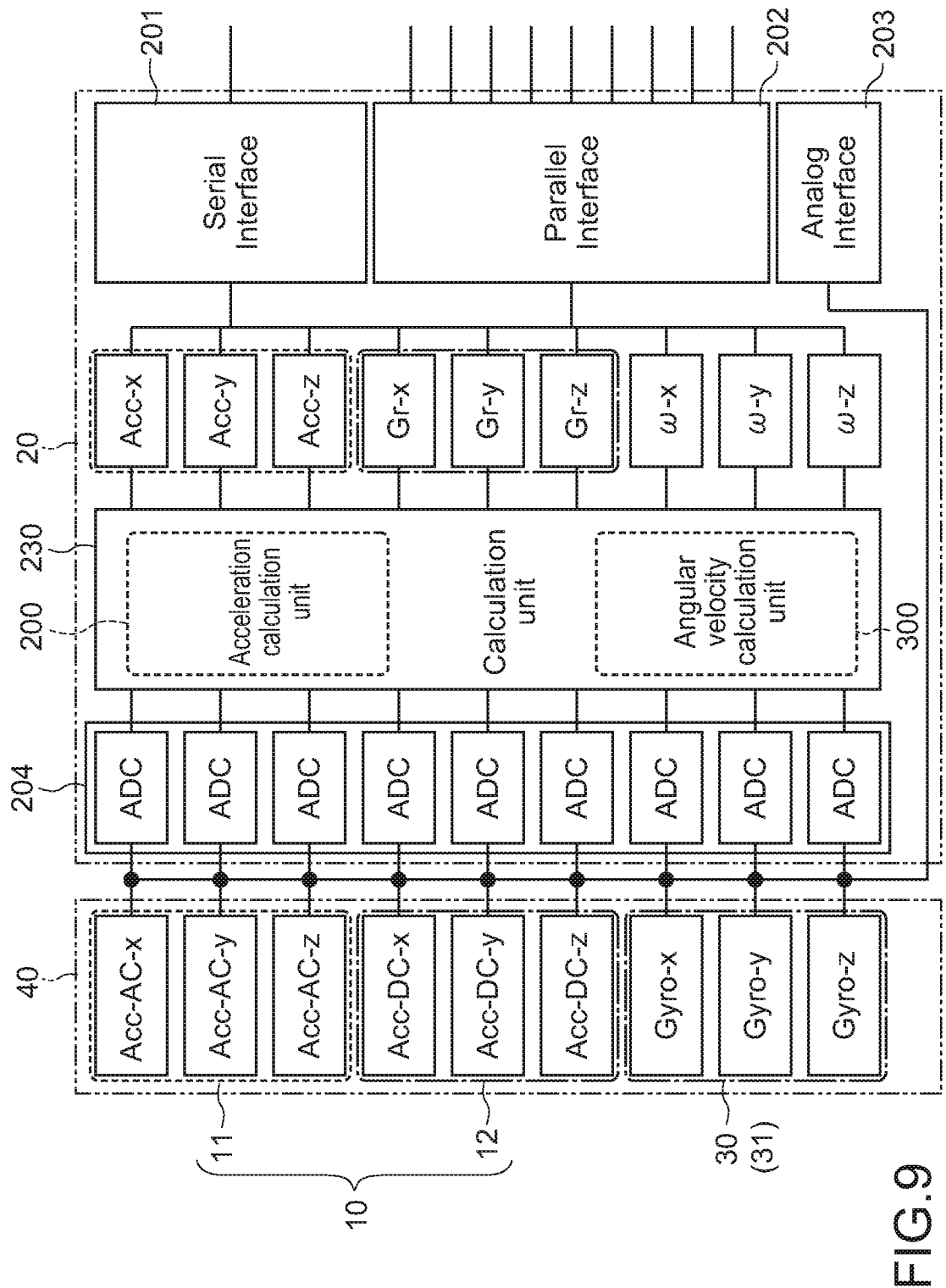
FIG. 9 is a block diagram illustrating a basic configuration of a signal processing circuit in the camera control device.

FIG. 9 is a block diagram illustrating a basic configuration of the signal processing circuit 20. As illustrated in the figure, the acceleration sensor device 10 includes two types of acceleration detection units (the first acceleration detection unit 11 and the second acceleration detection unit 12), each of which detects information relating to accelerations in three axis directions. The angular velocity sensor device 30 has an angular velocity detection unit 31.

The first acceleration detection unit 11 is a piezoelectric acceleration sensor, and outputs each of a signal (Acc-AC-x) containing information relating to acceleration parallel to the x-axis direction, a signal (Acc-AC-y) containing information relating to acceleration parallel to the y-axis direction, and a signal (Acc-AC-z) containing information relating to acceleration parallel to the z-axis direction. These signals (first acceleration detection signals) have an AC waveform corresponding to the acceleration of each axis.

Meanwhile, the second acceleration detection unit 12 is a non-piezoelectric acceleration sensor, and outputs each of a signal (Acc-DC-x) containing information relating to acceleration parallel to the x-axis direction, a signal (Acc-DC-y) containing information relating to acceleration parallel to the y-axis direction, and a signal (Acc-DC-z) containing information relating to acceleration parallel to the z-axis direction. These signals (second acceleration detection signals) have an output waveform in which an AC component corresponding to acceleration of each axis is superimposed on a DC component.

The signal processing circuit 20 can be realized by hardware devices used for a computer such as a central processing unit (CPU), a random access memory (RAM), a read only memory (ROM), etc. and necessary software. Instead of or in addition to the CPU, a programmable logic device (PLD) such as a field programmable gate array (FPGA) or a digital signal processor (DSP) may be used.

The signal processing circuit 20 includes an acceleration calculation unit 200 that extracts each of a dynamic acceleration component and a static acceleration component from accelerations in the three axis directions on the basis of the output (first acceleration detection signal) of the first acceleration detection unit 11 and the output (second acceleration detection signal) of the second acceleration detection unit 12, and an angular velocity calculation unit 300 that computes each of the angular velocity signals (ω-x, ω-y, and ω-z) (third detection signal) around the three axes on the basis of the angular velocity detection signals (Gyro-x, Gyro-y, and Gyro-z) around the three axes. The acceleration calculation unit 200 corresponds to the difference calculation circuit unit 511 (FIG. 8) described above.

The signal processing circuit 20 further includes a serial interface 201, a parallel interface 202, and an analog interface 203.

The acceleration calculation unit 200 extracts each of the dynamic acceleration components (Acc-x, Acc-y, and Acc-z) and the static acceleration components (Gr-x, Gr-y, and Gr-z) on the basis of the acceleration detection signal in each axis direction output from the first acceleration detection unit 11 and the second acceleration detection unit 12.

Note that the acceleration calculation unit 200 is realized by loading a program recorded in a ROM, which is an example of a non-transitory computer readable recording medium, into a RAM, etc. and executing the program by the CPU.

The angular velocity calculation unit 300 computes each of the angular velocity signals (ω-x, ω-y, and ω-z) around the three axes on the basis of the angular velocity detection signals (Gyro-x, Gyro-y, and Gyro-z) around the three axes. The angular velocity calculation unit 300 may be configured separately from the acceleration calculation unit 200 or may be configured by a calculation unit 230 common to the acceleration calculation unit 200.

The serial interface 201 is configured to be able to successively output the dynamic and static acceleration components of the respective axes generated in the acceleration calculation unit 200 and the angular velocity signal of each axis generated in the angular velocity calculation unit 300 to the correction signal generation circuit 51. The parallel interface 202 is configured to be able to output the dynamic acceleration component and the static acceleration component of each axis generated in the acceleration calculation unit 200 in parallel to the correction signal generation circuit 51. The signal processing circuit 20 may include at least one of the serial interface 201 or the parallel interface 202, or may be selectively switched by an instruction from the correction signal generation circuit 51. The analog interface 203 is configured to be able to output the outputs of the first and second acceleration detection units 11 and 12 to the correction signal generation circuit 51 without change, and may be omitted as necessary.

Note that in FIG. 9, reference numeral 204 denotes a converter for analog-digital (AD) conversion of the acceleration detection signal of each axis. The preprocessing circuit 510 illustrated in FIG. 8 may be included in a block 204 including the converter or may be included in the calculation unit 230.

Figure 10:
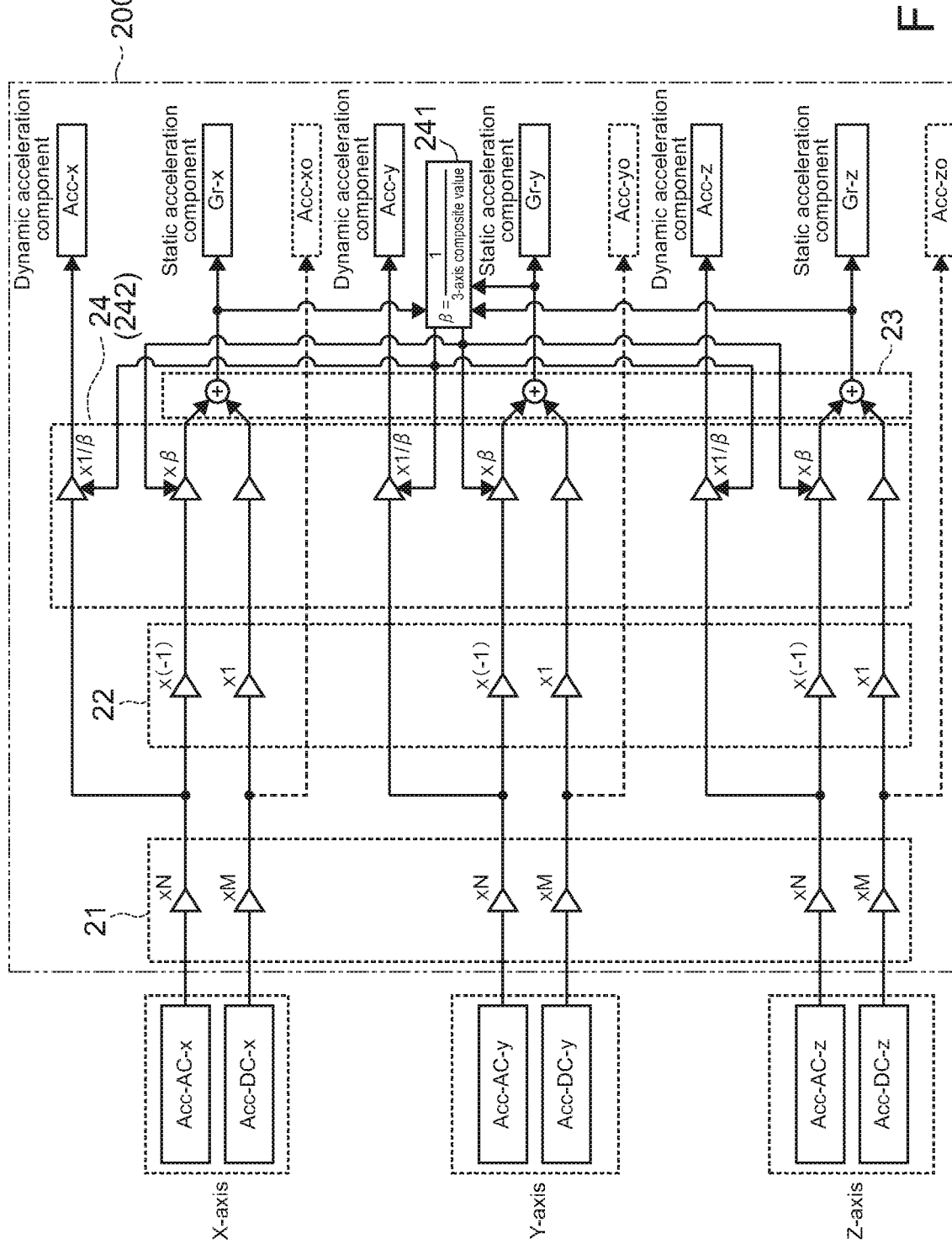
FIG. 10 is a circuit diagram illustrating a configuration example of an acceleration calculation unit in the signal processing circuit.

FIG. 10 is a circuit diagram illustrating a configuration example of the acceleration calculation unit 200.

The acceleration calculation unit 200 includes a gain adjustment circuit 21, a sign inversion circuit 22, an addition circuit 23, and a correction circuit 24. These circuits 21 to 24 have a common configuration for each axis of x, y and z, and perform common calculation processing on each axis, so that a dynamic acceleration component (motion acceleration) and a static acceleration component (gravitational acceleration) of each axis are extracted.

Figure 11:
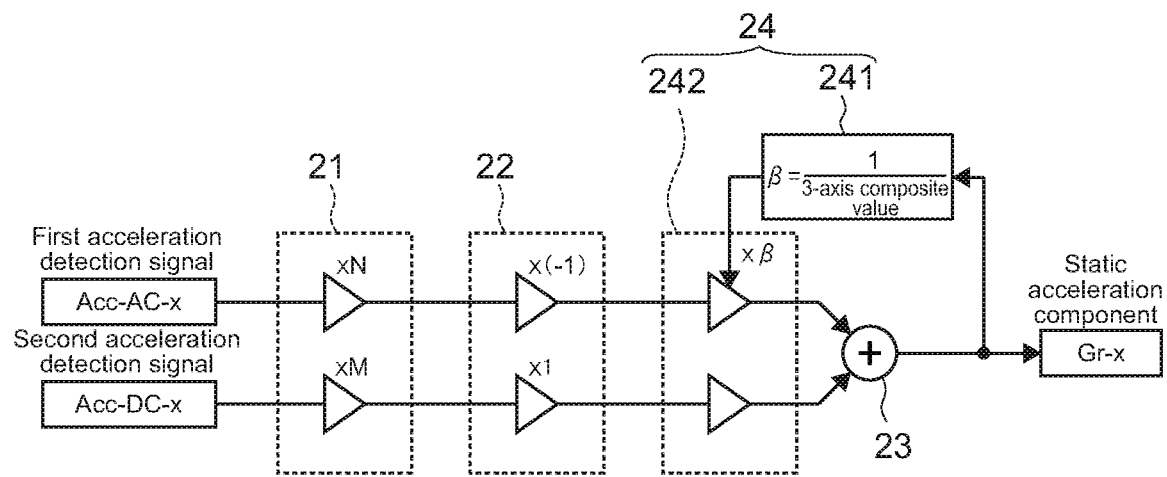
FIG. 11 is a diagram illustrating a processing block in one axis direction in the acceleration calculation unit.

Hereinafter, as a representative example, a processing circuit for an acceleration detection signal in the x-axis direction will be described. FIG. 11 illustrates a processing block for extracting a static acceleration component from an acceleration detection signal in the x-axis direction.

The gain adjustment circuit 21 adjusts gain of each signal so that the first acceleration detection signal (Acc-AC-x) in the X-axis direction output from the first acceleration detection unit 11 (11$x$1 and 11$x$2) and the second acceleration detection signal (Acc-DC-x) in the x-axis direction output from the second acceleration detection unit 12 (12$x$1 and 12$x$2) are mutually at the same level. The gain adjustment circuit 21 has an amplifier for amplifying the output (Acc-AC-x) of the first acceleration detection unit 11 and the output (Acc-DC-x) of the second acceleration detection unit 12.

Figure 12:
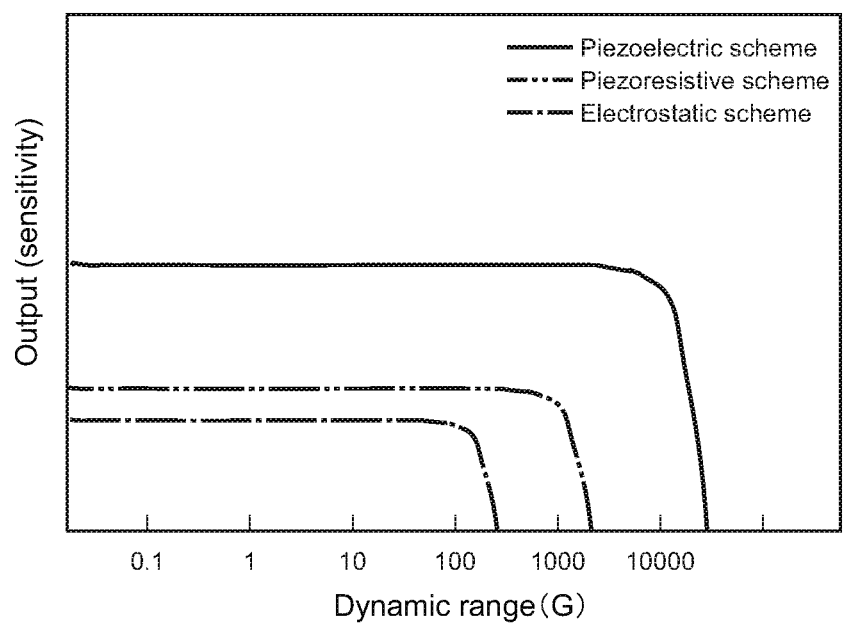
FIG. 12 is a diagram for description of output characteristics of a plurality of acceleration sensors having different detection schemes.

In general, output sensitivity and a dynamic range of the acceleration sensor differ depending on the detection scheme. For example, as illustrated in FIG. 12, the output sensitivity is high and the dynamic range is wide (large) in a piezoelectric acceleration sensor than in a non-piezoelectric (piezoresistive or electrostatic) acceleration sensor. In the present embodiment, the first acceleration detection unit 11 corresponds to a piezoelectric acceleration sensor, and the second acceleration detection unit 12 corresponds to a piezoresistive acceleration sensor.

Therefore, the gain adjustment circuit 21 amplifies the outputs of the respective acceleration detection units 11 and 12 (first and second acceleration detection signals) by N and M times, respectively, so that the outputs of the acceleration detection units 11 and 12 have the same level. The amplification factors N and M are positive numbers and satisfy a relationship of N<M. The values of the amplification factors N and M are not particularly limited, and may be set as coefficients that serve as temperature compensation of the acceleration detection units 11 and 12 depending on the use environment (use temperature) of the detection unit 40.

Figure 13:
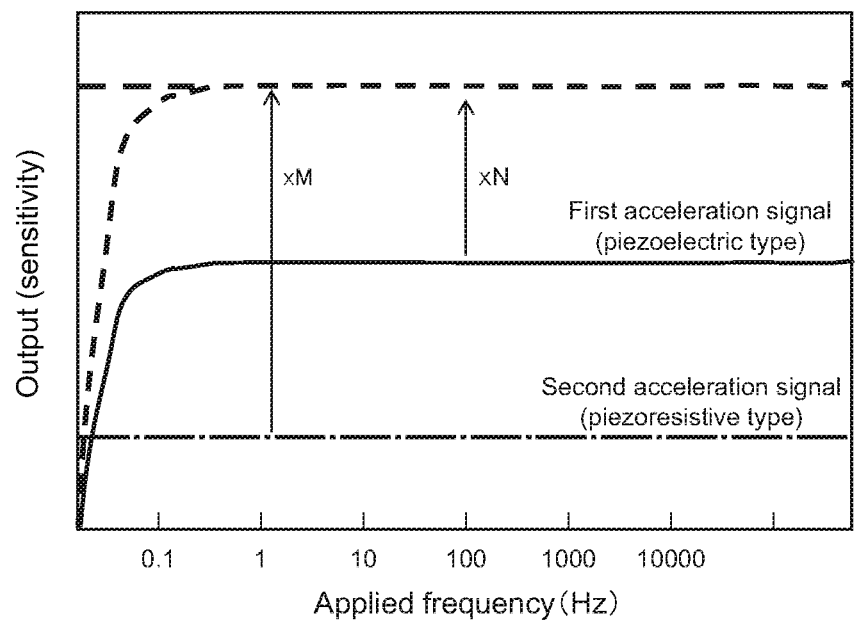
FIG. 13 is a diagram for description of one action of the acceleration calculation unit.

FIG. 13 is an example of output characteristics of the first acceleration detection signal and the second acceleration detection signal, and illustrates the output characteristic before gain adjustment and the output characteristic after gain adjustment in comparison. In the figure, a horizontal axis indicates a frequency of acceleration acting on the detection unit 40, and a vertical axis indicates the output (sensitivity) (the same is applied to FIG. 14 to FIG. 18).

As illustrated in the figure, in a first acceleration detection signal (Acc-AC-x) of a piezoelectric scheme, output sensitivity of an acceleration component in a low frequency region of 0.5 Hz or less is lower than the output sensitivity of the acceleration component in a higher frequency region. In particular, the output sensitivity in a stationary state (motion acceleration 0) is approximately zero. Meanwhile, a second acceleration detection signal (Acc-DC-x) of a piezoresistive scheme has constant output sensitivity over the entire frequency range, and thus an acceleration component in a stationary state (that is, a static acceleration component) can be detected at constant output sensitivity. Therefore, when the gain adjustment circuit 21 amplifies the first acceleration detection signal and the second acceleration detection signal at predetermined magnifications, respectively, to obtain the same output level, it is possible to extract a static acceleration component in a difference calculation circuit described below.

The sign inversion circuit 22 and the addition circuit 23 constitute a difference calculation circuit that extracts a static acceleration component (DC component) from acceleration of each axis direction on the basis of a difference signal between the first acceleration detection signal (Acc-AC-x) and the second acceleration detection signal (Acc-DC-x).

Figure 14:
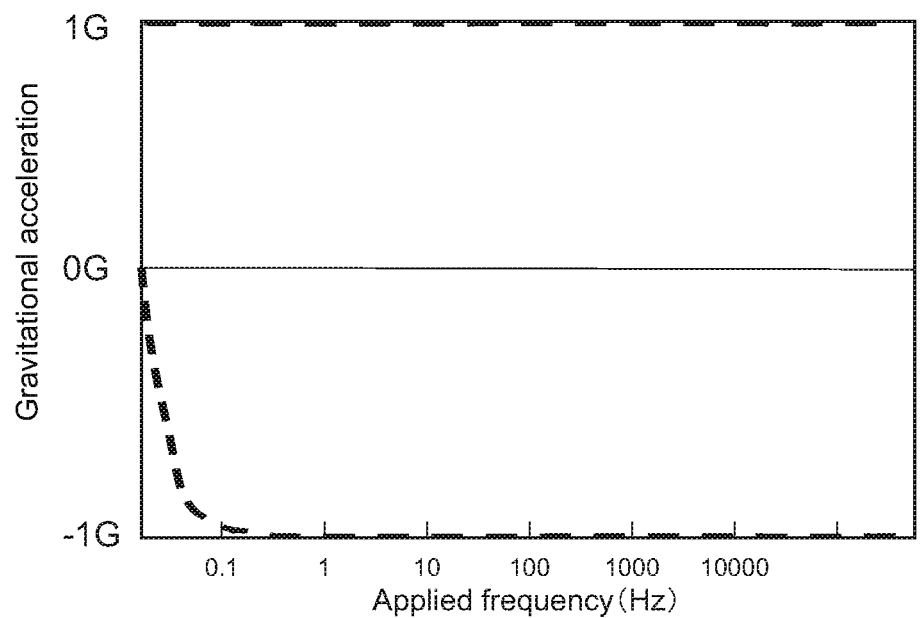
FIG. 14 is a diagram for description of one action of the acceleration calculation unit.

The sign inversion circuit 22 has an inversion amplifier (amplification factor: −1) that inverts the sign of the first acceleration detection signal (Acc-AC-x) after gain adjustment. FIG. 14 illustrates an example of an output characteristic of the first acceleration detection signal (Acc-AC-x) after sign inversion. Here, a case in which the sensor device 10 detects acceleration of 1 G in the x-axis direction is illustrated as an example.

Note that the second acceleration detection signal (Acc-DC-x) is output to the addition circuit 23 in a subsequent stage without inverting the sign thereof. The sign inversion circuit 22 may be configured in common with the gain adjustment circuit 21 in a preceding stage.

Figure 15:
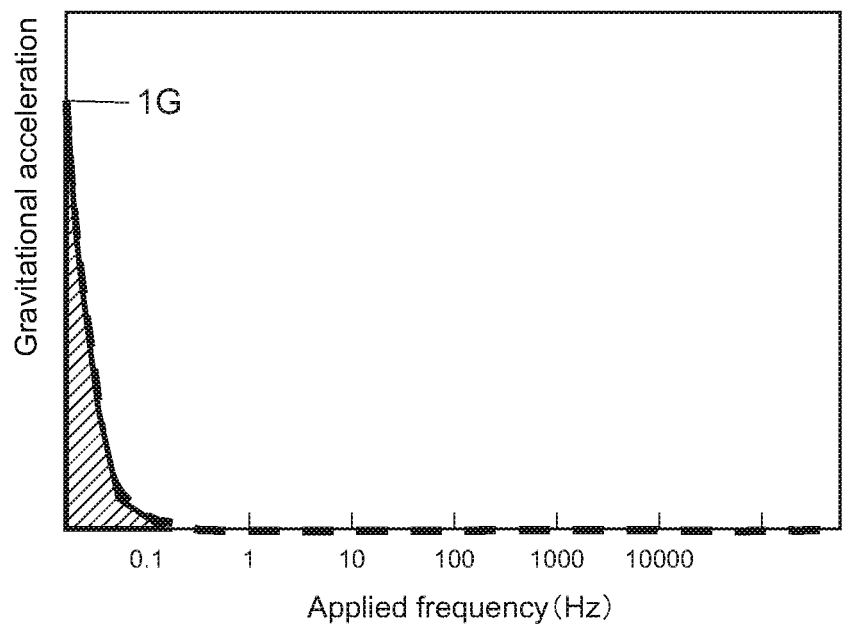
FIG. 15 is a diagram for description of one action of the acceleration calculation unit.

The addition circuit 23 adds the first acceleration detection signal (Acc-AC-x) and the second acceleration detection signal (Acc-DC-x) output from the sign inversion circuit 22 to output a static acceleration component. FIG. 15 illustrates an example of an output characteristic of the addition circuit 23. Since the first and second acceleration detection signals are adjusted to the same level in the gain adjustment circuit 21, a net static acceleration component (Gr-x) can be extracted by obtaining a difference signal thereof. The static acceleration component typically corresponds to a gravitational acceleration component or an acceleration component including the gravitational acceleration.

Figure 16:
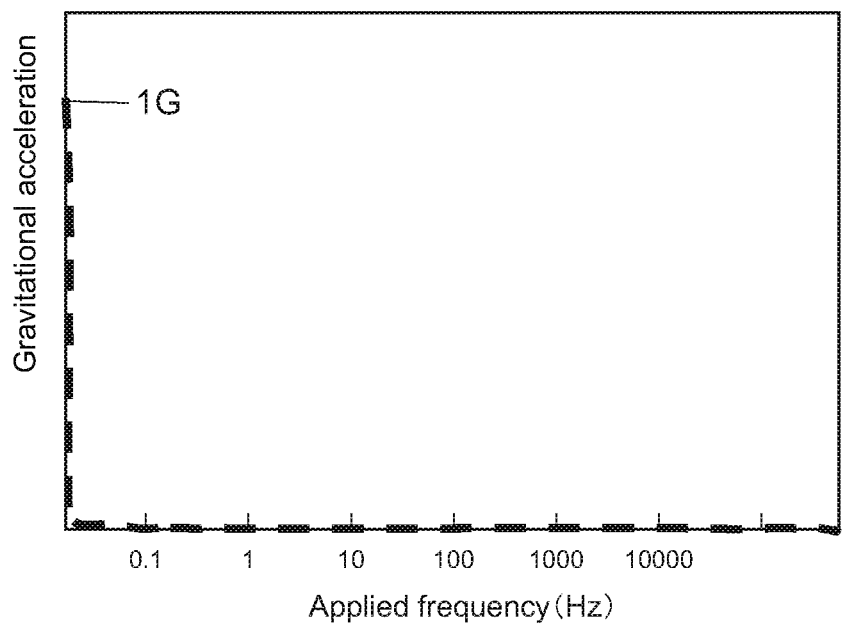
FIG. 16 is a diagram for description of one action of the acceleration calculation unit.

When the static acceleration component output from the addition circuit 23 corresponds to only gravitational acceleration, theoretically, an output of a significant acceleration component appears only near 0 Hz as illustrated in FIG. 16.

However, in practice, since detection sensitivity in the vicinity of a low frequency of the first acceleration detection unit 11 having a piezoelectric detection type is low, and acceleration components in axis directions (here, the y-axis direction and the z-axis direction) other than a target axis unavoidably superimposes due to generation of sensitivities of other axes, a dynamic acceleration component in a frequency domain indicated by hatching in FIG. 15 leaks into an output of the addition circuit 23 as an error component. Therefore, in the present embodiment, the correction circuit 24 for canceling the error on the basis of the output of the addition circuit 23 is provided.

The correction circuit 24 includes a 3-axis composite value calculation unit 241 and a low band sensitivity correction unit 242. The correction circuit 24 computes a correction coefficient β on the basis of the output of the addition circuit 23 (the difference signal between the first and second acceleration detection signals), and corrects the first acceleration detection signal (Acc-AC-x) using the correction coefficient β.

The 3-axis composite value calculation unit 241 is commonly provided for processing blocks that extract static acceleration components in all the x-axis, y-axis, and z-axis directions, and computes the correction coefficient β using a sum value of the output (the difference signal between the first and second acceleration detection signals) of the addition circuit 23 in each axis.

Specifically, the 3-axis composite value calculation unit 241 computes a composite value ($\sqrt{((Gr-x)^2+(Gr-y)^2+(Gr-z)^2)}$) of the static acceleration components (Gr-x, Gr-y, and Gr-z) in the three axis directions, and regards a portion of the composite value exceeding 1 as a low band sensitivity error portion (area indicated by hatching in FIG. 15) to compute the correction coefficient β corresponding to a reciprocal of the composite value.

$$\beta = 1/\sqrt{((Gr-x)^2+(Gr-y)^2+(Gr-z)^2)}$$

Note that values of the static acceleration components (Gr-x, Gr-y, and Gr-z) in the three respective axis directions differ depending on the posture of the acceleration sensor device 10, and momentarily change corresponding to posture change of the acceleration sensor device 10. For example, when the z-axis direction of the acceleration sensor device 10 coincides with a gravity direction (vertical direction), the static acceleration component (Gr-z) in the z-axis direction indicates a larger value than the static acceleration components (Gr-x, and Gr-y) in the x-axis direction and the y-axis direction. In this way, it is possible to estimate the gravity direction of the acceleration sensor device 10 at the time from the values of the static acceleration components (Gr-x, Gr-y, and Gr-z) in the three respective axis directions.

Figure 17:
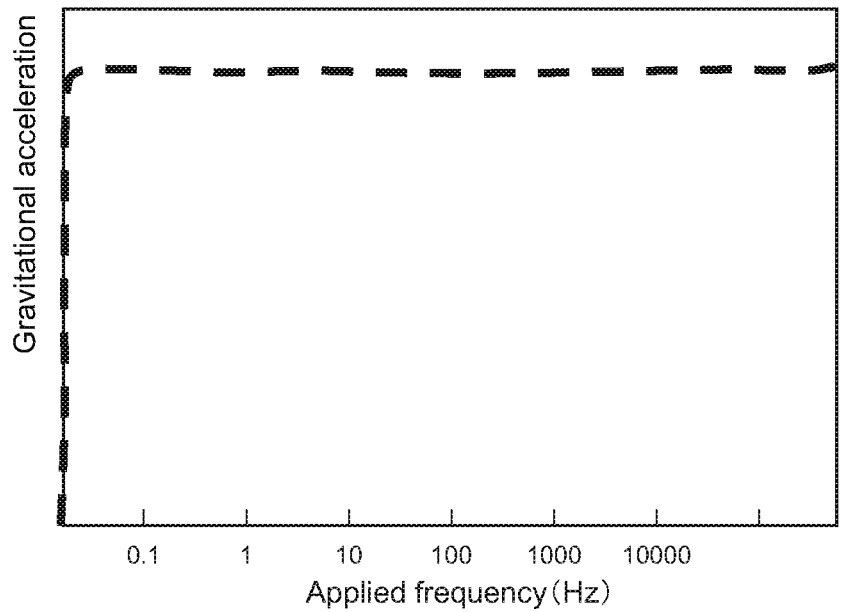
FIG. 17 is a diagram for description of one action of the acceleration calculation unit.
Figure 18:
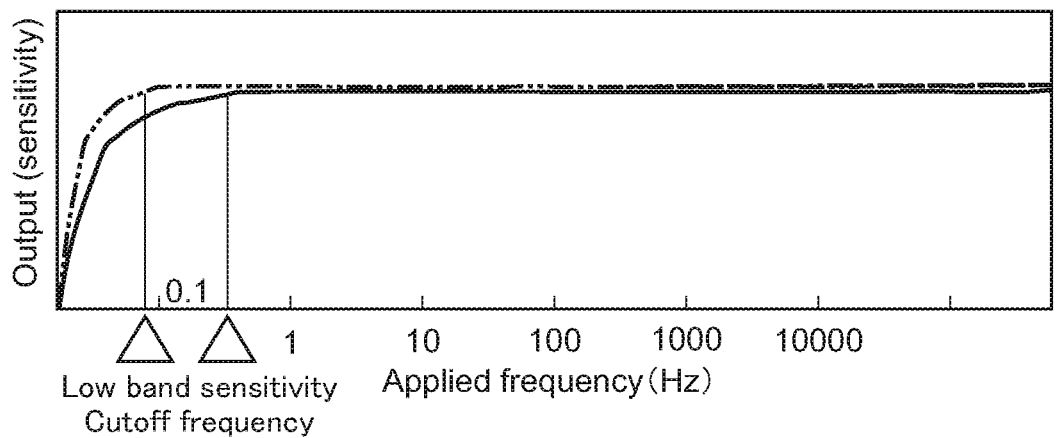
FIG. 18 is a diagram for description of one action of the acceleration calculation unit.

The low band sensitivity correction unit 242 has a multiplier that multiplies the correction coefficient β by the first acceleration detection signal (Acc-AC-x) whose sign is inverted. In this way, the first acceleration detection signal is input to the addition circuit 23 in a state in which a low band sensitivity error is reduced, and thus an acceleration signal having a frequency characteristic illustrated in FIG. 17 is output from the addition circuit 23. In this way, since only the static acceleration component corresponding to the gravitational acceleration is output, extraction accuracy of the gravitational acceleration component is improved.

In the present embodiment, the correction circuit 24 is configured to execute a process of multiplying the first acceleration detection signal by the correction coefficient β at the time of calculating the static acceleration component. However, the present technology is not limited thereto. The correction circuit 24 may be configured to execute a process of multiplying the second acceleration detection signal (Acc-DC-x) by the correction coefficient β, or the acceleration detection signal to be corrected may be switched between the first acceleration detection signal and the second acceleration detection signal corresponding to a magnitude of an acceleration change.

The correction circuit 24 is configured to correct the first acceleration detection signal using the correction coefficient β when the change in acceleration of either one of the first acceleration detection signal and the second acceleration detection signal is greater than or equal to a predetermined value. The larger the change in acceleration (the higher an applied frequency), the higher a rate at which an error component leaks into the first acceleration detection signal. Thus, the error component can be efficiently reduced. The configuration is particularly effective when the motion acceleration is relatively large, for example, for motion analysis application.

Meanwhile, the correction circuit 24 is configured to correct the second acceleration detection signal using the correction coefficient β when the change in acceleration of either one of the first acceleration detection signal and the second acceleration detection signal is less than or equal to a predetermined value. The smaller the change in acceleration (the lower the applied frequency), the higher a rate at which the error component leaks into the second acceleration detection signal. Thus, the error component can be efficiently reduced. The configuration is particularly effective when the motion acceleration is relatively small as in a leveling operation of a digital camera.

The static acceleration component in each axis direction is extracted as described above. However, for extraction of the dynamic acceleration components (Acc-x, Acc-y, and Acc-z) in the respective axis direction, as illustrated in FIG. 10, the first acceleration detection signals (Acc-AC-x, Acc-AC-y, and Acc-AC-z) whose gains are adjusted in the gain adjustment circuit 21 are referred to.

Here, even though the first acceleration detection signal may be used without change for extraction of the dynamic acceleration component, since a part of the dynamic acceleration component may leak into the static acceleration component as described above in some cases, the dynamic acceleration component decreases, so that highly accurate detection becomes difficult. Therefore, by correcting the first acceleration detection signal using the correction coefficient β computed in the correction circuit 24, it is possible to achieve the detection accuracy of the dynamic acceleration component.

More specifically, as illustrated in FIG. 10, the correction circuit 24 (the low band sensitivity correction unit 242) has the multiplier that multiplies the reciprocal (1/β) of the correction coefficient β acquired by the 3-axis composite value calculation unit 241 by the first acceleration detection signals (Acc-AC-x, Acc-AC-y, and Acc-AC-z). In this way, a low band sensitivity component of the first acceleration signal is compensated, and thus the extraction accuracy of the dynamic acceleration components (Acc-x, Acc-y, and Acc-z) is improved. The output characteristics of the dynamic acceleration components are schematically illustrated in FIG. 17.

In the present embodiment, the correction circuit 24 is configured to execute a process of multiplying the first acceleration detection signal by the reciprocal (1/β) of the correction coefficient at the time of calculating the dynamic acceleration component. However, the present technology is not limited thereto, and the correction circuit 24 may be configured to execute a process of multiplying the second acceleration detection signals (Acc-DC-x, Acc-DC-y, and Acc-DC-z) by the reciprocal (1/β) of the correction coefficient. Alternatively, similarly to the above-described scheme of calculating the static acceleration component, the acceleration detection signal to be corrected may be switched between the first acceleration detection signal and the second acceleration detection signal corresponding to the magnitude of the acceleration change.

It is presumed that a process of correcting the dynamic acceleration component and the static acceleration component by the low band sensitivity correction unit 242 is typically effective when the composite value computed by the 3-axis composite value calculation unit 241 is other than 1 G (G: gravitational acceleration). Note that examples of a case in which the composite value is less than 1 G include a case in which the sensor device 10 is falling free, etc.

Note that the first acceleration detection signal detected by the piezoelectric scheme has an output characteristic similar to that of a high pass filter (HPF), and an output less than or equal to a cutoff frequency remains in an output of the addition circuit 23 as an error component of low band sensitivity (see FIG. 15). In the present embodiment, the error component is reduced by an arithmetic scheme using the correction circuit 24. However, to enhance canceling accuracy of the error component, it is desirable that the cutoff frequency is as low as possible.

Therefore, for example, a piezoelectric having a relatively large capacitance and internal resistance may be used as a piezoelectric film of the detection devices (11x1, 11x2, 11y1, and 11y2) included in the first acceleration detection unit 11. In this way, for example, as indicated by an alternate long and short dash line in FIG. 18, a cutoff frequency of the low band sensitivity can be reduced as close to 0 Hz as possible, and thus an error component of the low band sensitivity can be reduced as much as possible.

Next, a description will be given of a method of processing an acceleration signal in the acceleration calculation unit 200 configured as described above.

When acceleration acts on the acceleration sensor device 10, the movable plate 120 moves relative to the base portion 115 in a manner illustrated in FIGS. 7A, 7B, and 7C corresponding to a direction of the acceleration. The first acceleration detection unit 11 (detection devices 11x1, 11x2, 11y1, and 11y2) and the second acceleration detection unit 12 (detection devices 12x1, 12x2, 12y1, and 12y2) output detection signals corresponding to mechanical deformation of the bridge portions 131 to 134 to the signal processing circuit 20.

Figure 19:
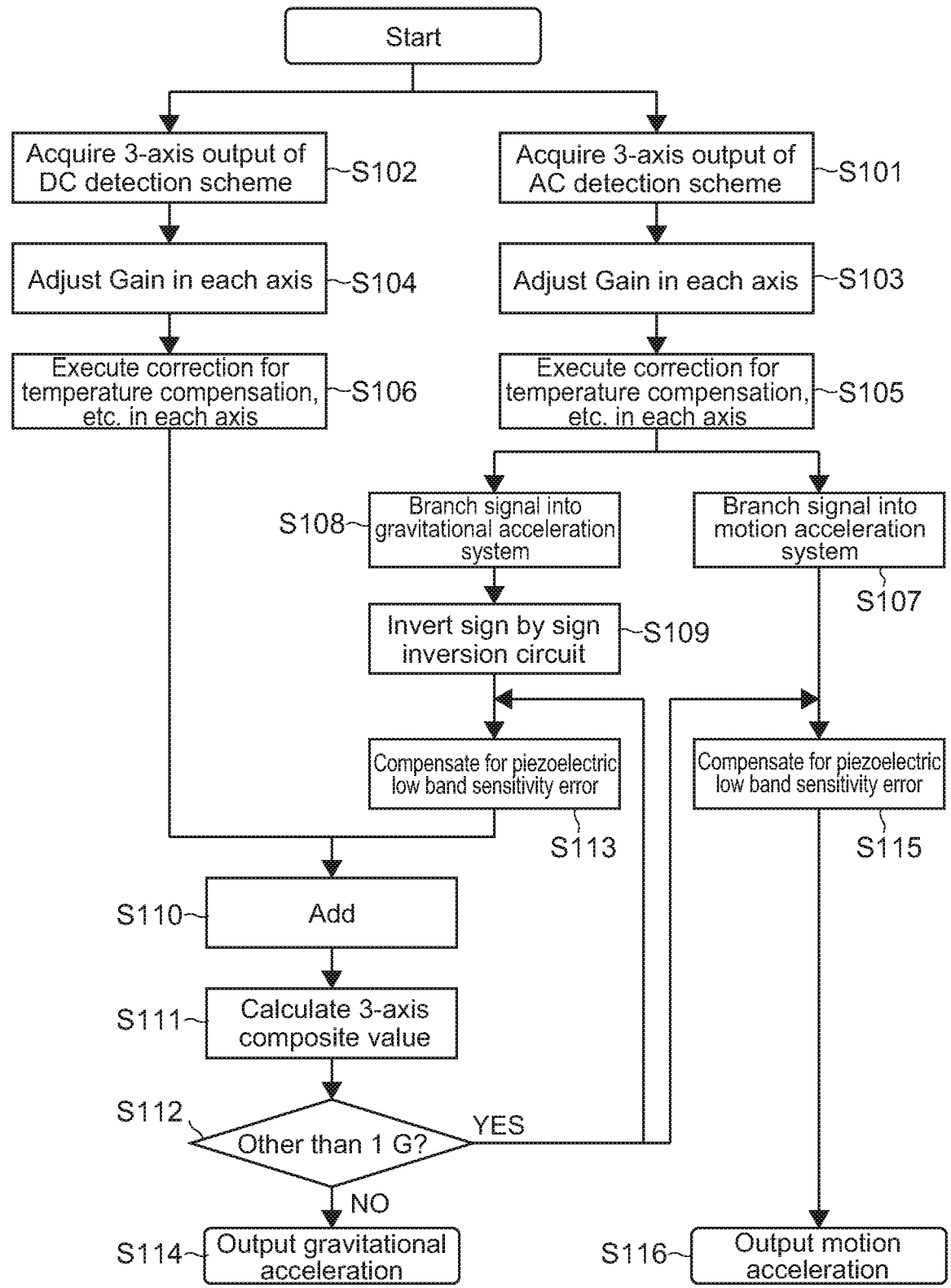
FIG. 19 is a flowchart illustrating an example of a processing procedure of the acceleration calculation unit.

FIG. 19 is a flowchart illustrating an example of a processing procedure for the acceleration detection signal in the signal processing circuit 20 (acceleration calculation unit 200).

The signal processing circuit 20 receives the first acceleration detection signals (Acc-AC-x, Acc-AC-y, and Acc-AC-z) in the respective axes from the first acceleration detection unit 11 and receives (acquires) the second acceleration detection signals (Acc-DC-x, Acc-DC-y, and Acc-DC-z) in the respective axes from the second acceleration detection unit 12 at a predetermined sampling interval (steps 101 and 102). Acquisition of these detection signals may be performed simultaneously (in parallel) or successively (in series).

Subsequently, the signal processing circuit 20 adjusts the gain of each detection signal in the gain adjustment circuit 21 so that the first and second acceleration detection signals have the same level for each axis (FIG. 13, steps 103 and 104). Further, as necessary, correction for the purpose of temperature compensation of the first and second acceleration detection signals is performed for each axis (steps 105 and 106).

Subsequently, the signal processing circuit 20 branches the first acceleration detection signals (Acc-AC-x, Acc-AC-y, and Acc-AC-z) of the respective axes into a dynamic acceleration computation system (motion acceleration system) and a static acceleration computation system (gravitational acceleration system) (steps 107 and 108). The first acceleration detection signal branched into the static acceleration computation system is input to the addition circuit 23 after the sign thereof is inverted in the sign inversion circuit 22 (FIG. 14, step 109).

The signal processing circuit 20 causes the addition circuit 23 to add the first acceleration detection signals (Acc-AC-x, Acc-AC-y, and Acc-AC-z) whose signs are inverted and the second acceleration detection signals (Acc-DC-x, Acc-DC-y, and Acc-DC-z) to compute the static acceleration components (Gr-x, Gr-y, and Gr-z) for the respective axes (FIG. 15, step 110). Further, the signal processing circuit 20 calculates the 3-axis composite value of these static acceleration components in the 3-axis composite value calculation unit 241 (step 111), and executes a process of multiplying the correction coefficient β corresponding to the reciprocal of the composite value by the first acceleration detection signals (Acc-AC-x, Acc-AC-y, and Acc-AC-z) whose signs are inverted when the value is other than 1 G in the low band sensitivity correction unit 242 (steps 112 and 113). When the composite value is 1 G, the signal processing circuit 20 outputs the computed gravitational acceleration component (static acceleration component) to the outside (step 114). Note that the present technology is not limited thereto, and the computed gravitational acceleration component (static acceleration component) may be output to the outside each time the composite value is computed.

Meanwhile, when the composite value is other than 1 G, the signal processing circuit 20 executes a process of multiplying the reciprocal (1/β) of the computed correction coefficient β by the first acceleration detection signals (Acc-AC-x, Acc-AC-y, and Acc-AC-z) branched into the motion acceleration system (steps 112 and 115). When the composite value is 1 G, the signal processing circuit 20 outputs the computed motion acceleration component (dynamic acceleration component) to the outside (step 116). Note that the present technology is not limited thereto, and the computed motion acceleration component (dynamic acceleration component) may be output to the outside each time the composite value is computed.

As described above, the detection unit 40 of the present embodiment is configured to extract the dynamic acceleration component and the static acceleration component from these outputs using a difference in detection scheme between the first and second acceleration detection units 11 and 12. In this way, the motion acceleration acting on the camera 100 to be detected can be accurately measured.

In addition, according to the present embodiment, since the gravitational acceleration component can be extracted with high accuracy from the output of the detection unit 40, posture of a detection target with respect to the gravity direction can be detected with high accuracy. In this way, it possible to detect the posture of the camera 100 with respect to the horizontal direction with high accuracy.

Further, according to the present embodiment, since the piezoelectric acceleration sensor is adopted for the first acceleration detection unit 11 and a non-piezoelectric (piezoresistive or capacitive) acceleration sensor is adopted for the second acceleration detection unit 12, it is possible to obtain an inertial sensor having a wide dynamic range and high sensitivity in a low frequency range.

According to the camera 100 of the present embodiment configured as described above, the dynamic acceleration component and the static acceleration component are extracted from acceleration on the basis of the first acceleration detection signals (Acc-AC-x, Acc-AC-y, and Acc-AC-z) and the second acceleration detection signals (Acc-DC-x, Acc-DC-y, and Acc-DC-z), and thus the acceleration component corresponding to the gravitational acceleration can be separated from the acceleration acting on the camera 100. As a result, it becomes possible to effectively correct a translational shake in macro photography, etc. and it is possible to improve the camera shake correction accuracy.

In addition, according to the present embodiment, information relating to the posture of the camera 100 with respect to the horizontal direction is acquired on the basis of the second acceleration detection signals (Acc-DC-x, Acc-DC-y, and Acc-DC-z), and thus the posture of the camera 100 with respect to the horizontal direction can be detected with high accuracy.

Second Embodiment

Figure 20:
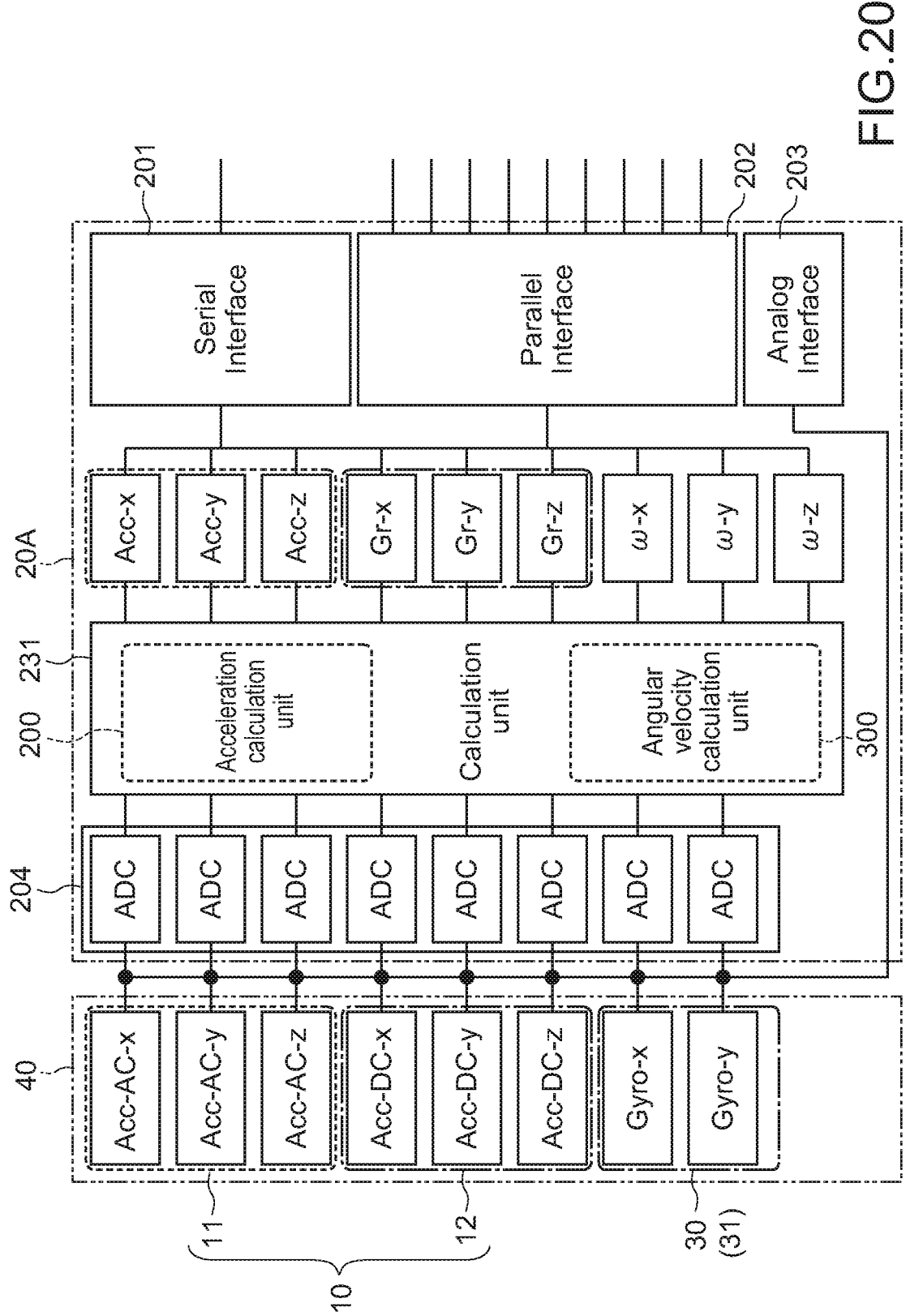
FIG. 20 is a block diagram schematically illustrating a configuration of a camera control device according to another embodiment of the present technology.

FIG. 20 is a block diagram illustrating a configuration of a signal processing circuit 20A in a camera control device according to a second embodiment of the present technology. Hereinafter, a configuration different from that of the first embodiment will be mainly described, the same configuration as that of the first embodiment will be denoted by the same reference numeral, and a description thereof will be omitted or simplified.

The signal processing circuit 20A in the present embodiment is different from the signal processing circuit 20 (FIG. 9) of the first embodiment in that the signal processing circuit 20A does not include an angular velocity detection device (Gyro-z) for detecting the angular velocity (roll angular velocity (ω-z)) around the optical axis 811 (Z-axis) of the camera 100. The signal processing circuit 20A of the present embodiment includes a calculation unit 231 that computes an angular velocity around the Z-axis using the outputs (Acc-AC-x, Acc-AC-y, Acc-AC-z, Acc-DC-x, Acc-DC-y, and Acc-DC-z) of the acceleration sensor device 10.

Similarly to the calculation unit 230, the calculation unit 231 includes the acceleration calculation unit 200 and the angular velocity calculation unit 300. The calculation unit 231 is configured to compute the angular velocity (ω-z) around the axis (Z-axis) parallel to the optical axis of the camera 100 using the dynamic acceleration component (Acc-x) in the x-axis direction and the dynamic acceleration component (Acc-y) in the y-axis direction computed by the acceleration calculation unit 200.

Note that to facilitate description, in the following description, it is presumed that the x, y and z axes (see FIG. 4) in a coordinate system of the acceleration sensor device 10 coincide with the X, Y and Z axes (see FIG. 1) in a coordinate system of the camera, and the y-axis direction coincides with the gravity direction.

Figure 21:
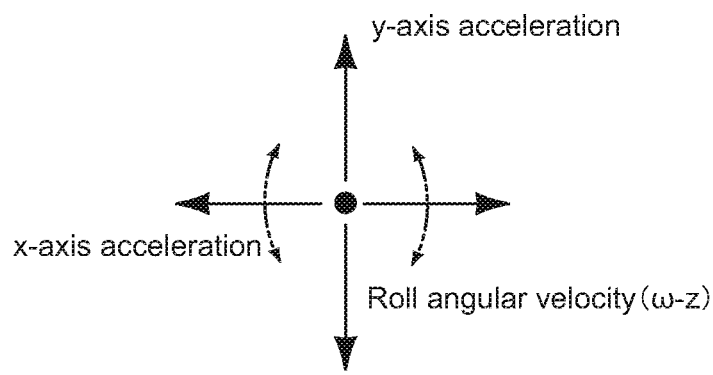
FIG. 21 is a diagram for description of an angular velocity detection method using an acceleration sensor.
Figure 22:
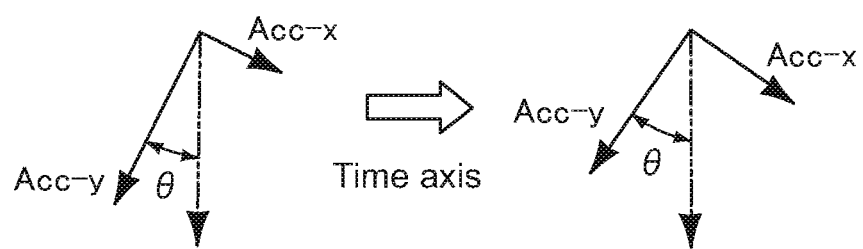
FIG. 22 is a diagram for description of an angular velocity detection method using the acceleration sensor.

FIG. 21 and FIG. 22 are schematic views illustrating a relationship between acceleration in the x-axis direction, acceleration in the y-axis direction, and angular velocity around the z-axis.

In a low frequency region of the motion acceleration acting on the camera 100, the gravitational acceleration (1 G) is dominant. For this reason, the gravity direction satisfies an equation below for the posture of the acceleration sensor device 10.

$$\theta = \arctan(Acc\text{-}x/Acc\text{-}y)$$

In this way, the gravity direction is present at an angle θ with respect to the y-axis of the sensor.

Here, since the angular velocity corresponds to an angle change within a certain time, it is possible to create a roll angular velocity (ω-z) on a plane including the xy axes by differentiating θ with respect to time. Therefore, the roll angular velocity (ω-z) can be computed by the following equation.

$$\text{Roll angular velocity } (\omega\text{-}z)[rad/s] = d\theta/dt$$

In the present embodiment, since the motion accelerations (Acc-x and Acc-y) in the x-axis and y-axis directions computed by the acceleration calculation unit 200 substantially do not include static components, that is, gravitational accelerations, the rotation angle with respect to the gravity direction can be accurately detected. Thus, it is possible to obtain the angular velocity (ω-z) around the z-axis with high accuracy without using the angular velocity detection device around the z-axis. In addition, for detection of the gravity direction, a composite vector of the static acceleration components (Gr-x, Gr-y, and Gr-z) computed by the acceleration calculation unit 200 may be referred to. In this way, it is possible to further improve the detection accuracy of the angular velocity around the z-axis.

In the present embodiment, similar effects as those of the above-described first embodiment can be obtained. According to the present embodiment, the angular velocity around the roll axis can be detected with high accuracy without the need for the angular velocity detection device around the roll axis, and thus it is possible to use a two-axis gyro sensor of the x-axis and the y-axis as the angular velocity sensor device 30. That is, since a function of a 6-axis sensor can be obtained by a 5-axis sensor, a sensor unit can be miniaturized and the cost can be reduced. Furthermore, the camera 100 can be reduced in size and thickness.

Even though the embodiments of the present technology have been described above, the present technology is not limited only to the above-mentioned embodiments, and various changes can be added.

For example, in the above embodiments, the digital still camera has been described as an example of the camera 100. However, the present technology is not limited thereto, and the present technology is applicable to a portable information terminal camera such as a digital video camera, a smartphone, etc., an on-vehicle camera, various surveillance cameras, etc.

Figure 23:
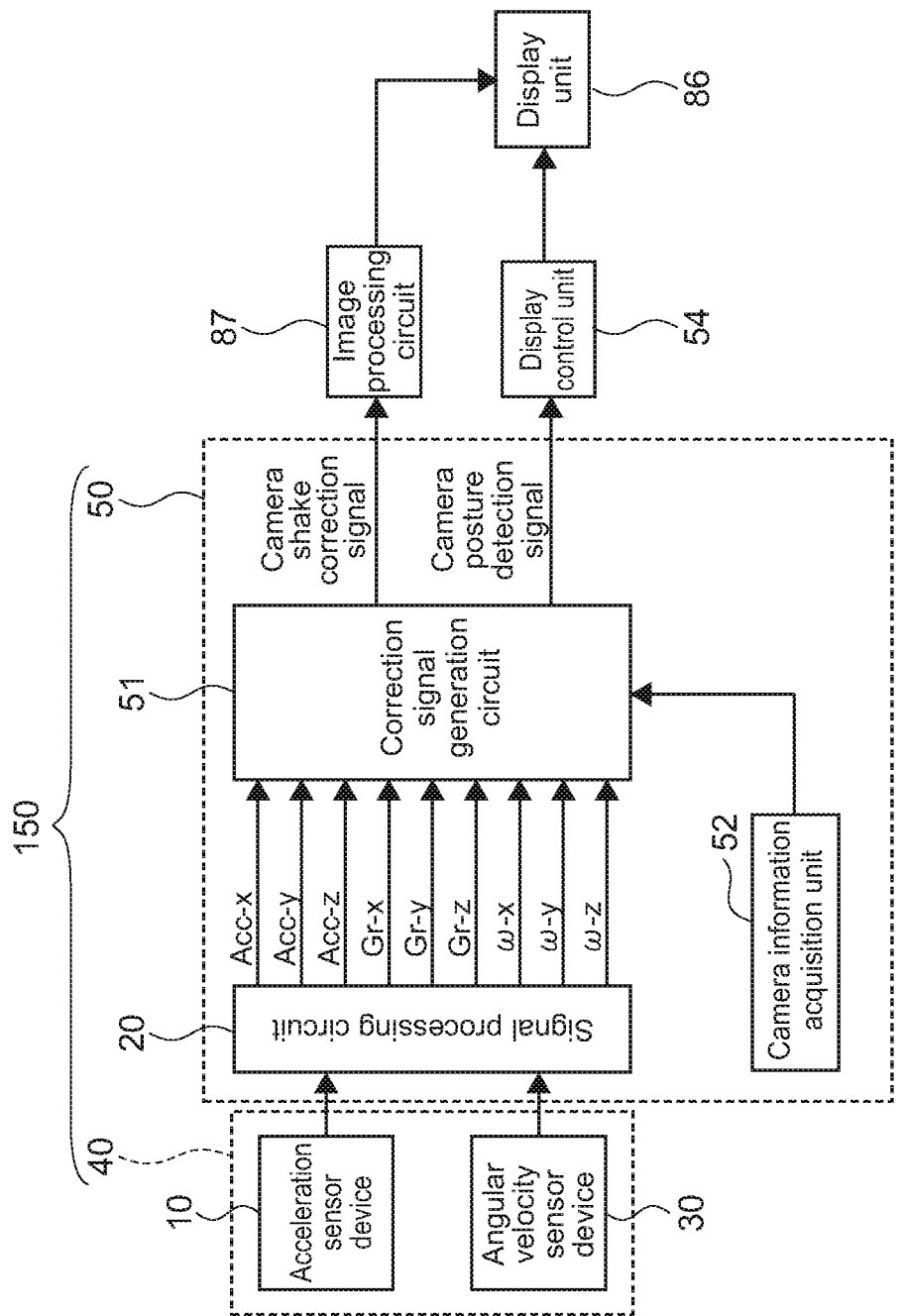
FIG. 23 is a block diagram illustrating a modification of the configuration of FIG. 3.

In addition, even though optical camera shake correction control for moving the correction lens 84 (or the imaging device 85) on the basis of the camera shake correction signal has been described in the above embodiments, the present technology is not limited thereto. For example, as illustrated in FIG. 23, the invention is applicable to an imaging device including an electronic camera shake correction image processing circuit 87 that moves pixels on the basis of the camera shake correction signal.

In addition, even though the acceleration sensor device 10 illustrated in FIGS. 4 to 6 is used as the acceleration sensor, a configuration is not particularly limited as long as accelerations in the three axis directions can be detected. Similarly, a calculation method for extracting the dynamic acceleration component and the static acceleration component from the acceleration acting on the sensor device is not limited to the above-described example, and an appropriate calculation method can be adopted.

Further, in the above embodiments, the first acceleration detection signals (Acc-AC-x, Acc-AC-y, and Acc-AC-z) and the second acceleration detection signals (Acc-DC-x, Acc-DC-y, and Acc-DC-z) are acquired from the same sensor device. However, the present technology is not limited thereto, and a sensor device that outputs each detection signal may be configured as a separate sensor device.

Note that, the present technology may have the following configurations.

(1) A camera control device including
a control unit that generates a first control signal for camera shake correction on a basis of a first acceleration detection signal, a second acceleration detection signal, and an angular velocity signal, the first acceleration detection signal including information relating to an acceleration acting on a camera, the first acceleration detection signal having an alternating current (AC) waveform corresponding to the acceleration, the second acceleration detection signal including information relating to the acceleration, the second acceleration detection signal having an output waveform, an AC component corresponding to the acceleration being superimposed on a direct current (DC) component in the output waveform, the angular velocity signal including information relating to an angular velocity acting on the camera.

(2) The camera control device according to item (1), in which
the control unit includes
an acceleration calculation unit that extracts a dynamic acceleration component and a static acceleration component from the acceleration on a basis of the first acceleration detection signal and the second acceleration detection signal, and
a correction signal generation circuit that generates the first control signal on a basis of the angular velocity signal and the dynamic acceleration component.

(3) The camera control device according to item (2), in which
the correction signal generation circuit further generates a second control signal including information relating to posture of the camera with respect to a horizontal direction on a basis of the static acceleration component.

(4) The camera control device according to any one of items (1) to (3), in which
the first acceleration detection signal includes information relating to accelerations in directions of two axes orthogonal to an optical axis of the camera,
the angular velocity signal includes information relating to angular velocities around the two axes, and
the control unit acquires information relating to an angular velocity around an axis parallel to the optical axis of the camera on a basis of the information relating to the accelerations in the directions of the two axes.

(5) The camera control device according to any one of items (2) to (4), in which
the acceleration calculation unit includes a calculation circuit that extracts the static acceleration component from the acceleration on a basis of a difference signal between the first acceleration detection signal and the second acceleration detection signal.

(6) The camera control device according to item (5), in which the acceleration calculation unit further includes a gain adjustment circuit that adjusts gain of each signal so that the first acceleration detection signal and the second acceleration detection signal are at the same level.

(7) The camera control device according to item (5) or (6), in which
the acceleration calculation unit further includes a correction circuit that computes a correction coefficient on a basis of the difference signal and corrects one of the first acceleration detection signal and the second acceleration detection signal using the correction coefficient.

(8) The camera control device according to any one of items (1) to (7), further including
a detection unit including a movable portion, a piezoelectric first acceleration detection unit, and a non-piezoelectric second acceleration detection unit, the movable portion being movable upon receiving an acceleration, the piezoelectric first acceleration detection unit being provided on the movable portion to output the first acceleration detection signal, the non-piezoelectric second acceleration detection unit being provided on the movable portion to output the second acceleration detection signal.

(9) The camera control device according to item (8), in which
the second acceleration detection unit includes a piezoresistive acceleration detection device.

(10) The camera control device according to item (8), in which
the second acceleration detection unit includes a capacitive acceleration detection device.

(11) An imaging device including:
an imaging device;
a lens for forming an image of a subject luminous flux on the imaging device;
a detection unit that outputs a first acceleration detection signal, a second acceleration detection signal, and an angular velocity signal, the first acceleration detection signal including information relating to an acceleration acting on a camera, the first acceleration detection signal having an AC waveform corresponding to the acceleration, the second acceleration detection signal including information relating to the acceleration, the second acceleration detection signal having an output waveform, an AC component corresponding to the acceleration is superimposed on a DC component in the output waveform, the angular velocity signal including information relating to an angular velocity acting on the camera; and
a control unit that generates a control signal for camera shake correction on a basis of the angular velocity signal, the first acceleration detection signal, and the second acceleration detection signal.

(12) The imaging device according to item (11), further including
a driving unit that moves the lens or the imaging device on a basis of the control signal.

(13) The imaging device according to item (11), further including
an electronic camera shake correction image processing circuit that generates a camera shake correction image on a basis of the control signal.

REFERENCE SIGNS LIST

10 acceleration sensor device
11 first acceleration detection unit 12 second acceleration detection unit
20, 20A signal processing circuit
30 angular velocity sensor device
40 detection unit
50 camera shake correction control unit
51 correction signal generation circuit
83 control unit
100 camera
150 camera control device
200 acceleration calculation unit
300 angular velocity calculation unit
511 difference calculation circuit unit
512 comparison calculation circuit unit
513 correction signal generation unit
514 horizontal direction computation/calculation unit
841 correction lens

The invention claimed is:

1. A camera control device, comprising:
  circuitry configured to:
    acquire information associated with an angular velocity around an axis parallel to an optical axis of a camera, based on information associated with accelerations in directions of two axes orthogonal to the optical axis of the camera; and
    generate a first control signal for a camera shake correction process based on a first acceleration detection signal, a second acceleration detection signal, and an angular velocity signal, wherein
      the first acceleration detection signal including information associated with the accelerations in the directions of the two axes orthogonal to the optical axis of the camera,
      the first acceleration detection signal has an alternating current (AC) waveform corresponding to the accelerations,
      the second acceleration detection signal including information associated with the accelerations,
      the second acceleration detection signal has an output waveform,
      an AC component corresponding to the accelerations is superimposed on a direct current (DC) component in the output waveform, and
      the angular velocity signal including information associated with angular velocities around the two axes.

2. The camera control device according to claim 1, wherein the circuitry is further configured to:
  extract a dynamic acceleration component and a static acceleration component from the accelerations, based on the first acceleration detection signal and the second acceleration detection signal; and
  generate the first control signal based on the angular velocity signal and the dynamic acceleration component.

3. The camera control device according to claim 2, wherein
  the circuitry is further configured to generate a second control signal including information associated with a posture of the camera with respect to a horizontal direction based on the static acceleration component.

4. The camera control device according to claim 2, wherein
  the circuitry is further configured to extract the static acceleration component from one of the accelerations, based on a difference signal between the first acceleration detection signal and the second acceleration detection signal.

5. The camera control device according to claim 4, wherein
  the circuitry is further configured to adjust gain of each of the first acceleration detection signal and the second acceleration detection signal so that the first acceleration detection signal and the second acceleration detection signal are at a same level.

6. The camera control device according to claim 4, wherein the circuitry is further configured to:
  compute a correction coefficient based on the difference signal; and
  correct one of the first acceleration detection signal or the second acceleration detection signal by use of the correction coefficient.

7. The camera control device according to claim 1, further comprising:
  an acceleration detection sensor including a movable portion, a piezoelectric first acceleration detection sensor, and a non-piezoelectric second acceleration detection sensor, wherein
    the movable portion is movable upon reception of the accelerations,
    the piezoelectric first acceleration detection sensor is on the movable portion to output the first acceleration detection signal, and
    the non-piezoelectric second acceleration detection sensor is on the movable portion to output the second acceleration detection signal.

8. The camera control device according to claim 7, wherein
  the second acceleration detection sensor includes a piezoresistive acceleration detection device.

9. The camera control device according to claim 7, wherein
  the second acceleration detection sensor includes a capacitive acceleration detection device.

10. An imaging device, comprising:
  an imaging device;
  a lens configured to form an image of a subject luminous flux on the imaging device;
  an acceleration detection sensor configured to output a first acceleration detection signal, a second acceleration detection signal, and an angular velocity signal, wherein
    the first acceleration detection signal including information associated with the accelerations in directions of two axes orthogonal to an optical axis of a camera,
    the first acceleration detection signal has an alternating current (AC) waveform corresponding to the accelerations,
    the second acceleration detection signal including information associated with the accelerations,
    the second acceleration detection signal has an output waveform,
    an AC component corresponding to the accelerations is on a direct current (DC) component in the output waveform, and
    the angular velocity signal including information associated with angular velocities around the two axes; and
  circuitry configured to:
    acquire information associated with an angular velocity around an axis parallel to the optical axis of the camera based on information associated with the accelerations in the directions of the two axes orthogonal to the optical axis of the camera; and generate a control signal for a camera shake correction process based on the angular velocity signal, the first acceleration detection signal, and the second acceleration detection signal.

11. The imaging device according to claim 10, further comprising:
a driving unit configured to move one of the lens or the imaging device based on the control signal.

12. The imaging device according to claim 10, further comprising:
an electronic camera shake correction image processing circuit configured to generate a camera shake correction image based on the control signal.

* * * * *